United States Patent
Takeuchi et al.

(10) Patent No.: US 7,266,758 B2
(45) Date of Patent: Sep. 4, 2007

(54) NETWORK MONITORING PROGRAM, NETWORK MONITORING METHOD, AND NETWORK MONITORING APPARATUS

(75) Inventors: Susumu Takeuchi, Kawasaki (JP); Norihiko Suzuki, Kawasaki (JP); Isao Sato, Kawasaki (JP); Kei Nakata, Kawasaki (JP); Kenichi Nakano, Kawasaki (JP); Hideyuki Kametani, Nei (JP); Osamu Nakajima, Nei (JP)

(73) Assignee: Fujitsu Limited, Kawasaki (JP)

(*) Notice: Subject to any disclaimer, the term of this patent is extended or adjusted under 35 U.S.C. 154(b) by 517 days.

(21) Appl. No.: 10/834,461

(22) Filed: Apr. 29, 2004

(65) Prior Publication Data

US 2005/0144505 A1    Jun. 30, 2005

(30) Foreign Application Priority Data

Nov. 28, 2003    (JP)    ............... 2003-399937

(51) Int. Cl.
 *H03M 13/00* (2006.01)
 *G06F 11/00* (2006.01)
 *G08C 25/00* (2006.01)
 *H04L 1/00* (2006.01)

(52) U.S. Cl. .................. 714/799; 714/4; 714/748; 714/749; 714/750; 714/723

(58) Field of Classification Search ................ 714/799, 714/723, 4, 748–750

See application file for complete search history.

(56) References Cited

U.S. PATENT DOCUMENTS

| | | | | |
|---|---|---|---|---|
| 4,283,720 A | * | 8/1981 | Herledan | 340/653 |
| 5,303,112 A | * | 4/1994 | Zulaski et al. | 361/67 |
| 6,324,161 B1 | * | 11/2001 | Kirch | 370/217 |

FOREIGN PATENT DOCUMENTS

JP    2002-099469    4/2002

* cited by examiner

*Primary Examiner*—Guy J. Lamarre
(74) *Attorney, Agent, or Firm*—Greer, Burns & Crain, Ltd.

(57) ABSTRACT

A network monitoring program automatically sorts fault producing locations on a network. A memory unit stores a fault location determining table containing events indicative of failures of communications via the network, the events being associated with classified elements which can be causes of faults on the network. A communication situation monitoring unit monitors communication situations with respect to other apparatus on the network. A failure detecting unit detects an event indicative of a failure from a communication situation detected by the communication situation monitoring unit. A fault location determining unit determines an element which is responsible for the event detected by the failure detecting unit by referring to the fault location determining table. A fault information output unit outputs fault information representative of a determined result from the fault location determining unit.

15 Claims, 26 Drawing Sheets

150
TROUBLE EVENT DB

151 FAULT PRODUCING EQUIPMENT CLASSIFICATION TABLE

| DETECTING CONDITION | FAULT PRODUCING EQUIPMENT |
|---|---|
| ACK RESPONSE TIME OF OWN APPARATUS IS GREATER THAN REFERENCE VALUE | OWN APPARATUS |
| FAILURE IS DETECTED IN ALL CONNECTIONS | ADJACENT TRANSMISSION PATH |
| FAILURE IS DETECTED AT UNSPECIFIC IP ADDRESS, PORT IN SOME CONNECTIONS | NON-ADJACENT TRANSMISSION PATH |
| FAILURE IS DETECTED AT SPECIFIC IP ADDRESS, PORT | COMPANION APPARATUS |

152 FAULT PRODUCING FUNCTION CLASSIFICATION TABLE

| DETECTING CONDITION | FAULT PRODUCING EQUIPMENT |
|---|---|
| CONNECTION AT IP LEVEL IS ESTABLISHED, BUT CONNECTION TO EACH PORT IS NOT ESTABLISHED | APPLICATION |
| CONNECTION IS ESTALISHED, BUT THERE IS NO RESPONSE ACCORDING TO PING COMMAND | NETWORK MONITORING UNIT |
| ⋮ | ⋮ |

FIG. 8

| STATE | NORMAL | NORMAL | NORMAL | NORMAL | NORMAL | — | FAILURE |
|---|---|---|---|---|---|---|---|
| TIME (SECONDS) | 0.5 | 1.0 | 2.5 | 3.0 | — | 6.0 |
| SRC-IP | 192.168.10.20 | 192.168.10.10 | 192.168.10.20 | 192.168.10.10 | 192.168.10.20 | 192.168.10.10 |
| SRC-Port | 10000 | 80 | 10000 | 80 | 10000 | 80 |
| DST-IP | 192.168.10.10 | 192.168.10.20 | 192.168.10.10 | 192.168.10.20 | 192.168.10.10 | 192.168.10.20 |
| DST-Port | 80 | 10000 | 80 | 10000 | 80 | 10000 |
| Sequence no | 1900 | 1000 | 2000 | 1010 | 2000 | 1010 |
| Ack no | 1000 | 2000 | 1010 | 2000 | 1030 | 2000 |
| Data Len | 100 | 10 | 0 | 20 | 100 | 20 |

FIG. 13

141 CONNECTION MANAGEMENT TABLE

| INTERFACE NAME | hme0 |
|---|---|
| OWN APPARATUS IP | 192.168.10.10 |
| OWN APPARATUS PORT | 80 |
| COMPANION APPARATUS IP | 192.168.10.20 |
| COMPANION APPARATUS PORT | 10000 |
| RETRANSMISSION COUNTER | 1 |
| DUPLICATED RECEPTION COUNTER | 0 |
| LOST PACKET COUNTER | 0 |
| RESPONSE DELAY COUNTER | 0 |
| PACKET SIZE COUNTER | 0 |
| PACKET NUMBER COUNTER | 0 |
| COMPANION APPARATUS RESPONSE TIME REFERENCE | 1.5 |
| OWN APPARATUS RESPONSE TIME REFERENCE | 0.5 |

FIG. 14

142 TRANSMISSION MONITORING TABLE

| SEQUENCE NO. PREDICTION | TIME | COMPANION APPARATUS RESPONSE TIME |
|---|---|---|
| 1010(1000+10) | 1.0 | 1.5 |
| 1030(1010+20) | 6.0 | |
| | | |

FIG. 15

143 RESPONSE MONITORING TABLE

| SEQUENCE NO. PREDICTION | TIME | OWN APPARATUS RESPONSE TIME |
|---|---|---|
| 2000(1900+100) | 2.5 | 0.5 |
| | | |
| | | |

FIG. 16

170 FAILURE LOCATION ESTIMATING TABLE (INTERFACE NAME : hme0)

| CONNECTION | NORMAL | FAILURE | | | | |
|---|---|---|---|---|---|---|
| | | RETRANSMISSION | DUPLICATED RECEPTION | LOST PACKET | TRANSMISSION-SIDE RESPONSE DELAY | RECEPTION-SIDE RESPONSE DELAY |
| A | 0 | 1 | 0 | 0 | 0 | 0 |
| B | 1 | 0 | 0 | 0 | 0 | 0 |
| C | 1 | 0 | 0 | 0 | 0 | 0 |
| D | 0 | 0 | 0 | 0 | 0 | 0 |

FIG. 21

171 STATUS CODE (INTERFACE NAME: hme0)

| RETRANSMISSION | DUPLICATED RECEPTION | LOST PACKET | TRANSMISSION-SIDE RESPONSE DELAY | RECEPTION-SIDE RESPONSE DELAY |
|---|---|---|---|---|
| 3 | 1 | 1 | 1 | 1 |

FIG. 22

141a CONNECTION MANAGEMENT TABLE

| | |
|---|---|
| INTERFACE NAME | hme0 |
| OWN APPARATUS IP | 192.168.10.10 |
| OWN APPARATUS PORT | 80 |
| COMPANION APPARATUS IP | *.*.*.* |
| COMPANION APPARATUS PORT | * |
| RETRANSMISSION COUNTER | 1 |
| DUPLICATED RECEPTION COUNTER | 0 |
| LOST PACKET COUNTER | 0 |
| RESPONSE DELAY COUNTER | 0 |
| PACKET SIZE COUNTER | 0 |
| PACKET NUMBER COUNTER | 0 |
| COMPANION APPARATUS RESPONSE TIME REFERENCE | 1.5 |
| OWN APPARATUS RESPONSE TIME REFERENCE | 0.5 |

FIG. 26

NETWORK MONITORING PROGRAM, NETWORK MONITORING METHOD, AND NETWORK MONITORING APPARATUS

BACKGROUND OF THE INVENTION (1) Field of the Invention

The present invention relates to a network monitoring program, a network monitoring method, and a network monitoring apparatus for monitoring the operating state of a network, and more particularly to a network monitoring program, a network monitoring method, and a network monitoring apparatus for detecting a fault that has occurred on a network.

(2) Description of the Related Art

As the information technology develops, many business enterprises are making efforts to rely upon computer systems to perform their business activities efficiently. A computer system has a plurality of communication units such as computers, switches, etc. connected to each other by a network. Networks are becoming larger in scale year after year because of an increasing range of business activities that can be performed by computers.

In view of attempts to make open and standardize system architectures, it has become possible to construct networks of a combination of apparatus manufactured by different manufacturers. Furthermore, efforts are being made to make apparatus on networks more intelligent, resulting in more complex network configurations.

If a large-scale, complex network suffers trouble, then the operating states of apparatus that make up the network are confirmed. However, there are many instances where a network fault cannot be judged based on the operating states of individual apparatus. Consequently, specifying the location and cause of a network failure is a highly difficult task to carry out. In addition, if the location and cause of a network failure cannot be found for a long period of time, then business activities of customers which rely on the network are suspended for a long time.

There has been proposed a technique for linking network design information and apparatus operation statistic information to each other and also for linking different protocol layers such as an IP (Internet Protocol) layer and an ATM (Asynchronous Transfer Mode) layer to each other display a list of operation statistic information (see, for example, Japanese unexamined patent publication No. 2002-99469 (paragraphs [0043]-[0044])). According to the proposed technique, operation statistic information is periodically collected from apparatus on a network, and the collected operation statistic information is compared with an index value. If the operation statistic information is in excess of the index value, then it is judged that a fault symptom has occurred. When symptom has occurred. When a fault symptom is detected, a list of operation statistic information with respect to apparatus that have produced the fault symptom is displayed to help specify a range in which the fault symptom has occurred.

However, though the technique disclosed in Japanese unexamined patent publication No. 2002-99469 can automatically detect a fault symptom, the location and cause of the fault have to be determined by the system administrator. For example, if data transmitted from an apparatus to another apparatus does not reach the other apparatus, then the conventional monitoring system allows the apparatus which has transmitted the data to detect the error. However, the conventional monitoring system is unable to automatically determine where a fault has occurred on a communication path from the source apparatus to the destination apparatus.

Heretofore, as described above, though it is possible to automatically detect a fault symptom from operation statistic information of each of the apparatus on the network, it is the system administrator who identifies an actual fault location. Consequently, it has been customary to spend an excessive period of time to perform a fault analysis. Since it is more difficult for larger-scale systems to identify a fault location, increased periods of time required for a fault analysis have posed a problem.

Another element which has made it difficult to carry out a fault analysis is the complexity of functions in each apparatus. Generally, communication functions on a network are separate in different layers. It is important to specify which function is suffering a fault for the purpose of taking a countermeasure against the fault. However, the conventional monitoring system does not have a monitoring function for a transport layer level. Though the conventional monitoring system has a monitoring function based on the monitoring function (ICMP (Internet Control Message Protocol) function) of network apparatus, the monitoring function does not depend on actual communication statuses, and the monitoring system may make a wrong decision. It has thus been difficult to accurately detect a fault of these functions.

SUMMARY OF THE INVENTION

It is therefore an object of the present invention to provide a network monitoring program, a network monitoring method, and a network monitoring apparatus for automatically sorting fault locations on a network.

To achieve the above object, there is provided a network monitoring program for detecting a fault producing location on a network. The network monitoring program enables a computer to function as memory unit for storing a fault location determining table containing events indicative of failures of communications via the network, the events being associated with classified elements which can be causes of faults on the network, communication situation monitoring unit for monitoring communication situations with respect to other apparatus on the network, failure detecting unit for detecting an event indicative of a failure from a communication situation detected by the communication situation monitoring unit, fault location determining unit for determining an element which is responsible for the event detected by the failure detecting unit by referring to the fault location determining table, and fault information output unit for outputting fault information representative of a determined result from the fault location determining unit.

To achieve the above object, there is also provided a network monitoring method for detecting a fault producing location on the network. The network monitoring method comprises the steps of monitoring, with communication situation monitoring unit, communication situations with respect to other apparatus on the network, detecting, with failure detecting unit, an event indicative of a failure from a communication situation detected by the communication situation monitoring unit, determining, with fault location determining unit, an element which is responsible for the event detected by the failure detecting unit by referring a fault location determining table containing events indicative of failures of communications via the network, the events being associated with classified elements which can be causes of faults on the network, and outputting, with fault information output unit, fault information representative of a determined result from the fault location determining unit.

To achieve the above object, there is further provided a network monitoring apparatus for detecting a fault producing location on the network, comprising memory unit for storing a fault location determining table containing events indicative of failures of communications via the network, the events being associated with classified elements which can be causes of faults on the network, communication situation monitoring unit for monitoring communication situations with respect to other apparatus on the network, failure detecting unit for detecting an event indicative of a failure from a communication situation detected by the communication situation monitoring unit, fault location determining unit for determining an element which is responsible for the event detected by the failure detecting unit by referring to the fault location determining table, and fault information output unit for outputting fault information representative of a determined result from the fault location determining unit.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 8 is a diagram showing a data structure of a trouble event DB (DataBase);

FIG. 13 is a diagram showing the contents of packets on the Web server;

FIG. 14 is a diagram showing a data structure of a connection management table;

FIG. 15 is a diagram showing a data structure of a transmission monitoring table;

FIG. 16 is a diagram showing a data structure of a reception monitoring table;

FIG. 21 is a diagram showing a data structure of a failure location estimating table;

FIG. 22 is a diagram showing an example of a status code;

FIG. 26 is a diagram showing a data structure of a connection management table in case an application is a server.

DESCRIPTION OF THE PREFERRED EMBODIMENTS

First, the concept of the present invention which is incorporated in an embodiment thereof will be described below. Thereafter, specific details of the embodiment of the present invention will be described.

Figure 1:
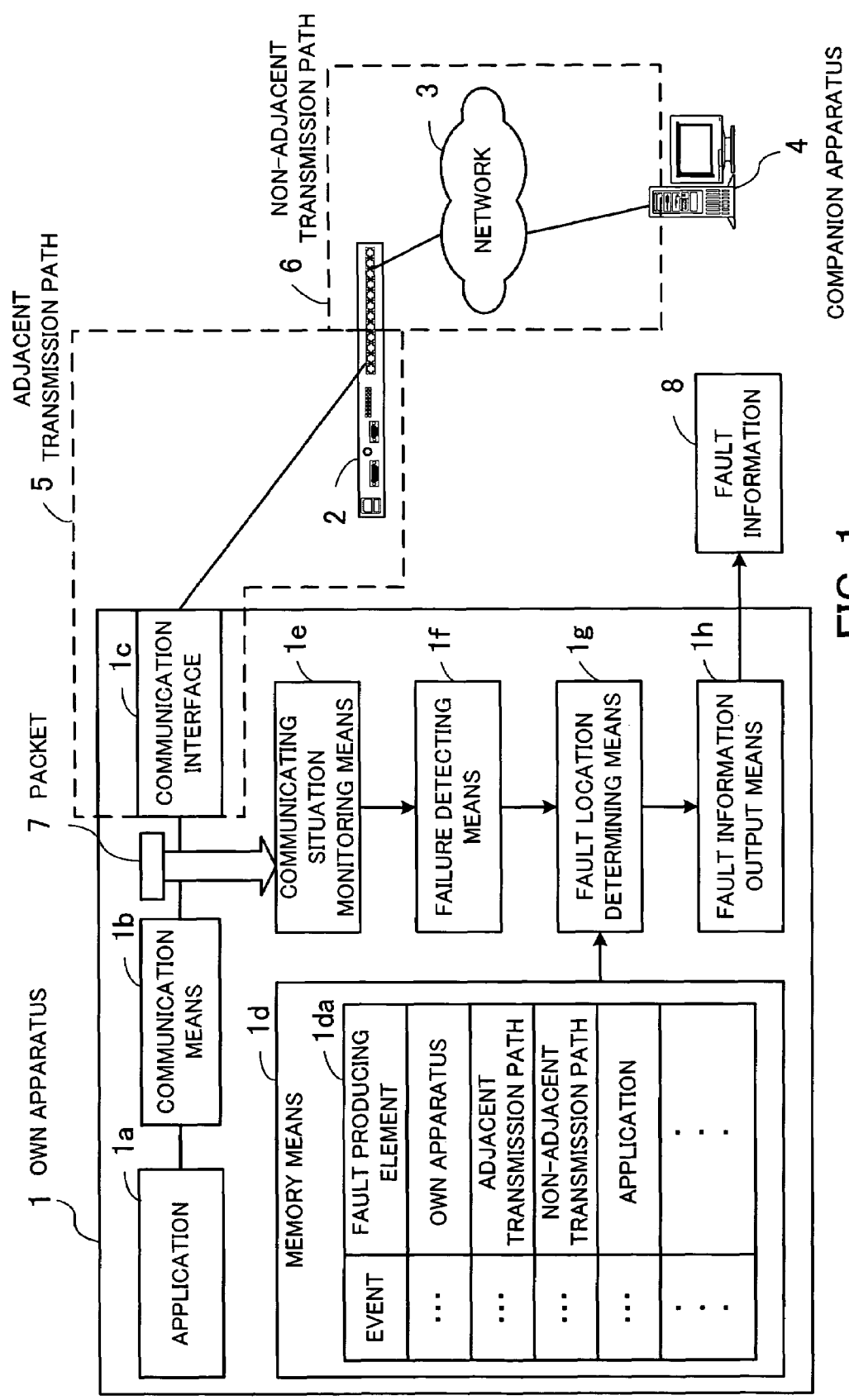
FIG. 1 is a block diagram showing the concept of the present invention which is incorporated in an embodiment thereof.

FIG. 1 shows the concept of the present invention which is incorporated in an embodiment thereof. In FIG. 1, an apparatus 1 serving as a network monitoring apparatus (hereinafter referred to as "own apparatus 1") is connected to a switch (SW) 2, which is connected to another apparatus 4 through a network 3. The apparatus 4 will hereinafter be referred to as "companion apparatus 4"). It is assumed that communications are performed between the own apparatus 1 which has a network monitoring function according to the present invention and the companion apparatus 4.

The own apparatus 1 has an application 1a, a communication means 1b, a communication interface 1c, a memory means 1d, a communicating situation monitoring means 1e, a failure detecting means 1f, a fault location determining means 1g, and a fault information output means 1h for performing communications with the companion apparatus 4 and monitoring the network 3.

The application 1a is a processing function that operates in the own apparatus 1. For example, a server function such as a Web server function may be installed as the application 1a. The communication means 1b controls data communications between the application 1a and the companion apparatus 4. The communication interface 1c performs communications through a connected transmission path.

The memory means 1d stores a fault location determining table 1da therein. The fault location determining table 1da stores classified elements which can be responsible for faults on the network 3 and events indicative of failures of communications over the network 3, the events being associated with the elements. The events that are indicative of failures include events which may be judged as failures due to a combination (or accumulation) of normal events.

According to one process of classifying fault producing elements, the elements are classified based on their relationship to the own apparatus 1. For example, the apparatus on the network 3 are classified as the own apparatus 1, an adjacent transmission path 5, a non-adjacent transmission path 6, and the companion apparatus 4.

According to another process of classifying fault producing elements, the elements are classified based on the functions that the apparatus on the network 3 have. For example, the elements are classified as the application 1a which operates in each apparatus, the communication means 1b which governs a communication function, etc.

The communicating situation monitoring means 1e monitors communicating situations between the own apparatus 1 and other apparatus on the network 3. For example, the communicating situation monitoring means 1e acquires a packet 7 transferred between the communication means 1b and the communication interface 1c, and analyzes the contents of the packet 7. The communicating situation monitoring means 1e can monitor communicating situations for respective connections. The communicating situation monitoring means 1e monitors not only communicating situations of abnormal communications, but also communicating situations of normal communications. For example, the communicating situation monitoring means 1e monitors normal communications that are performed at the same time as abnormal communications, and records a history of such normal communications. The history of such normal communications can also be effectively used to identify the cause of a fault.

The failure detecting means 1f detects events indicative of failures from the communicating situations detected by the communicating situation monitoring means 1e. For example, the failure detecting means 1f detects events including a response delay, a retransmission of a packet, a duplicated reception of a packet, etc. The failure detecting means 1f detects not only events indicative of failures, but also normal events that have occurred at the same time as the events indicative of failures.

The fault location determining means 1g refers to the fault location determining table 1da and determines an element which is responsible for an event detected by the failure detecting means 1f. Specifically, the fault location determining means 1g searches the fault location determining table 1da for an event corresponding to the event detected by the failure detecting means 1f. Then, the fault location determining means 1g determines the fault producing element associated with the detected event, as an element which is responsible for the event.

The fault information output means 1h outputs fault information 8 indicative of the determined result from the fault location determining means 1g.

According to a network monitoring program, the communicating situation monitoring means 1e monitors communicating situations between the own apparatus 1 and other apparatus on the network 3. The failure detecting means 1f detects an event indicative of a failure from the communicating situations detected by the communicating situation monitoring means 1e. The fault location determining means 1g determines an element which is responsible for the event detected by the failure detecting means 1f. The fault information output means 1h outputs fault information 8 indicative of the determined result from the fault location determining means 1g.

When an event indicative of a failure is detected, therefore, an element which is responsible for a fault due to the event can automatically be determined. As a consequence, it is possible to automatically avoid the fault or quickly recover from the fault.

On large-scale networks, the network monitoring function can be incorporated in a plurality of servers, and can be used with a management server which manages those servers. Such an arrangement makes it possible to monitor failures with higher accuracy and also to automatically avoid trouble. A network monitoring system having a network monitoring function and a management server according to the embodiment of the present invention will be described in specific detail below.

Figure 2:
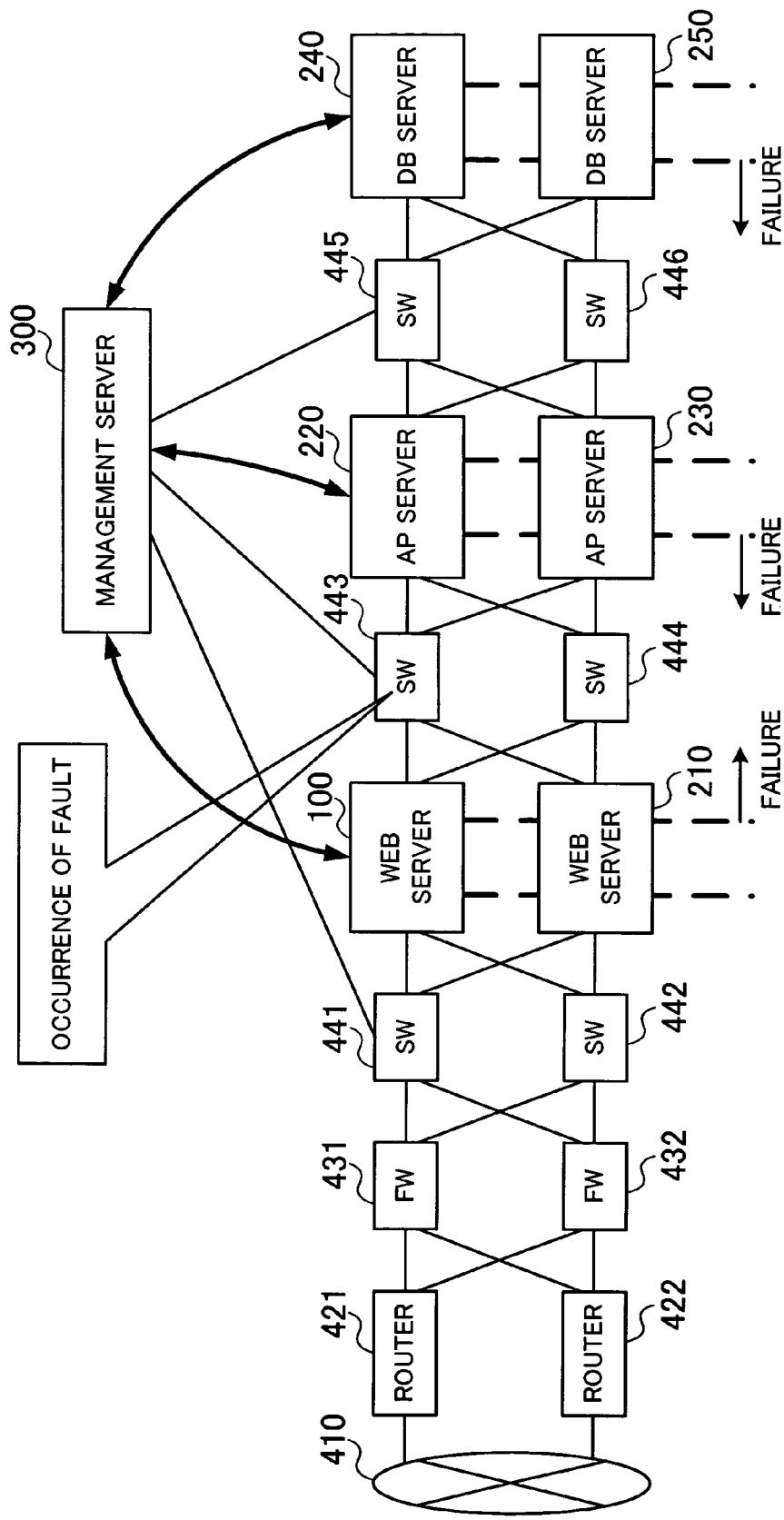
FIG. 2 is a block diagram of a network system.

FIG. 2 is a block diagram of a network system, which have various functions and communication paths that are provided in a duplex configuration. In the network system shown in FIG. 2, routers 421, 422 are connected to the Internet 410. Firewalls (FWs) 431, 432 are connected respectively to the routers 421, 422. Web servers 100, 210 are connected respectively to the FWs 431, 432 through respective switches (SWs) 441, 442. Application (AP) servers 220, 230 are connected respectively to the Web servers 100, 210 through respective switches (SWs) 443, 444. Database (DB) servers 240, 250 are connected respectively to the AP servers 220, 230 through respective switches (SWs) 445, 446.

A management server 300 is connected to the SWs 441, 443, 445. The SWs 441 through 446 comprise layer 3 switches (which determine destinations of packets based on data of a network layer (third layer) of the OSI reference model, and transfers packets to the determined destinations).

In the network system shown in FIG. 2, a network monitoring function is installed in the Web servers 100, 210, the application (AP) servers 220, 230, and the database (DB) servers 240, 250. Fault information that is detected by the network monitoring function is collected by the management server 300. The management server 300 analyzes the collected fault information to identify a fault location.

It is assumed that a fault has occurred in the SW 443. The Web server 100 can detect a failure on a communication path via the SW 443. The AP server 220 can also detect a failure on a communication path via the SW 443. The DB server 240 can detect a failure on non-adjacent communication paths via the SWs 445, 446. Fault information indicative of the failures detected by the respective servers are transmitted to the management server 300.

The management server 300 identifies a fault location based on the fault information transmitted from the servers. Specifically, the management server 300 can judge that a fault occurs in overlapping elements of the fault producing elements that are represented by the fault information collected from the servers. The network monitoring function installed in the servers thus allows an appropriate fault analysis to be performed quickly and accurately.

The network monitoring function installed in the Web server 100, for example, will be described in detail below. First, a hardware arrangement required to install the network monitoring function will be described below.

Figure 3:
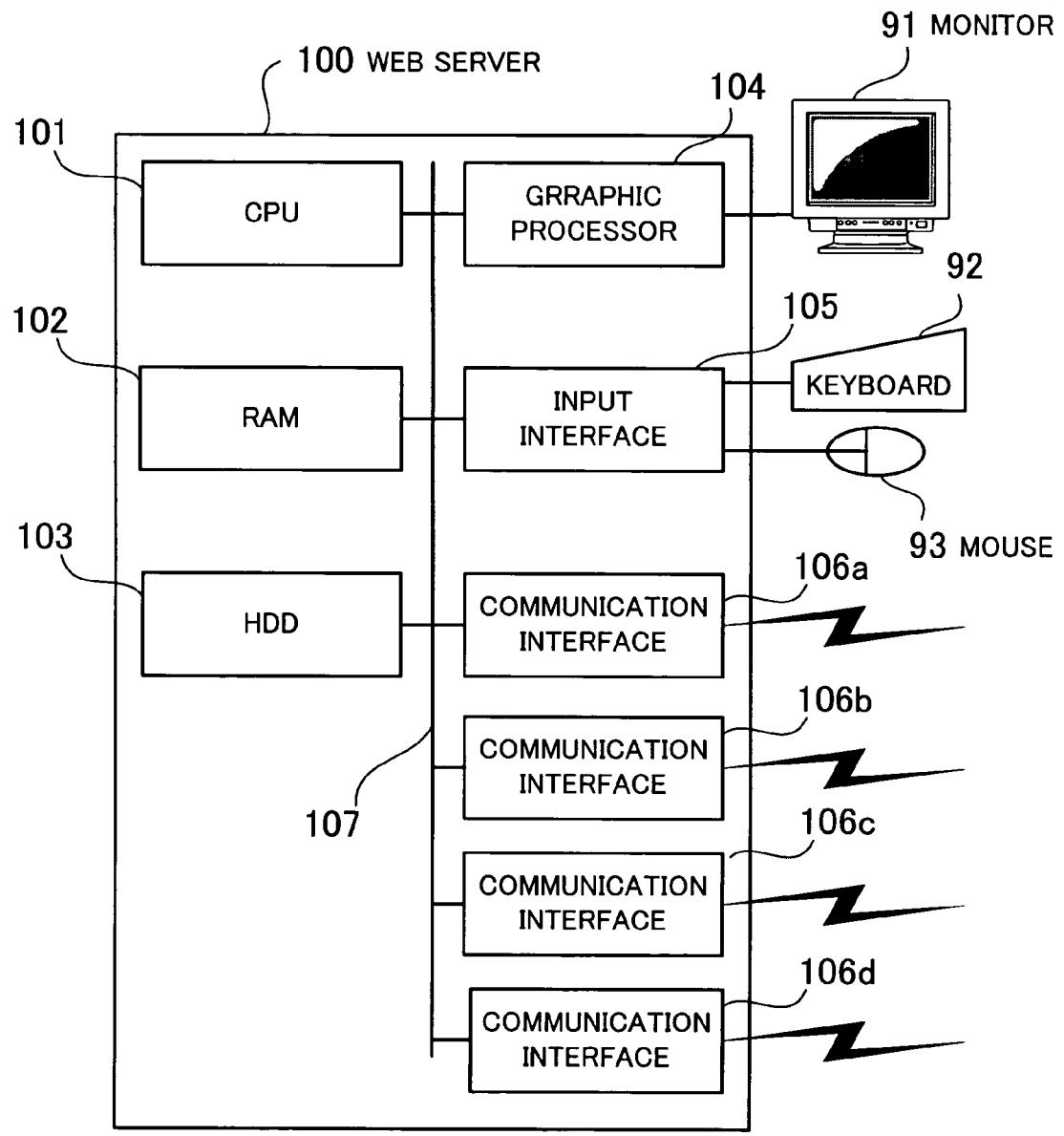
FIG. 3 is a block diagram of a hardware arrangement of a Web server which is employed in the embodiment of the present invention.

FIG. 3 is a block diagram of a hardware arrangement of a Web server which is employed in the embodiment of the present invention. As shown in FIG. 3, the Web server 100 is controlled in its entirety by a CPU (Central Processing Unit) 101. To the CPU 101, there are connected, by a bus 107, a RAM (Random Access Memory) 102, a HDD (Hard Disk Drive) 103, a graphic processor 104, an input interface 105, and a plurality of communication interfaces 106a, 106b, 106c, 106d.

The RAM 102 temporarily stores at least part of an OS (Operating System) program and application programs that are to be executed by the CPU 101. The RAM 102 also temporarily stores various data required in the processing operation of the CPU 101. The HDD 103 stores the OS program and the application programs.

A display monitor 91 is connected to the graphic processor 104. The graphic processor 104 displays images on the screen of the display monitor 91 according to instructions from the CPU 101. A keyboard 92 and a mouse 93 are connected to the input interface 105. The input interface 105 transmits signals sent from the keyboard 92 and the mouse 93 through the bus 107 to the CPU 101.

The communication interfaces 106a, 106b, 106c, 106d are connected respectively to the SWs 441 through 444. The communication interfaces 106a, 106b, 106c, 106d transmit data to and receive data from other computers via the SWs 441 through 444.

The hardware arrangement described above makes it possible to perform processing functions according to the present embodiment. While FIG. 3 shows the hardware arrangement of the Web server 100, the other servers such as the management server 300 can be implemented by the same hardware arrangement as shown in FIG. 3.

The network monitoring function installed in the Web server 100 is divided into a function that operates in the kernel of the OS and a function that operates in a user-oriented portion higher in level than the kernel.

Figure 4:
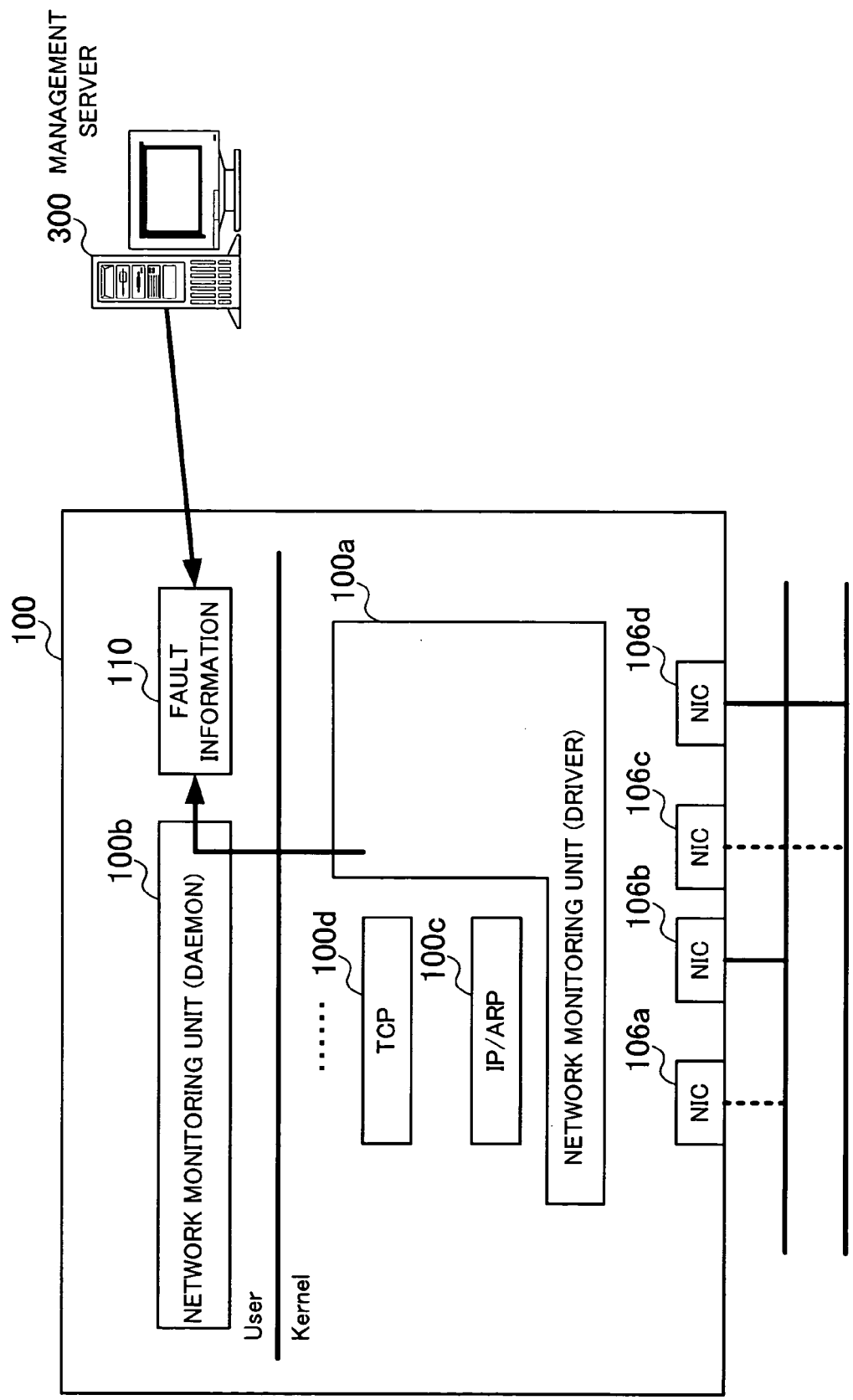
FIG. 4 is a block diagram of a software arrangement of the Web server.

FIG. 4 is a block diagram of a software arrangement of the Web server 100. In FIG. 4, network monitoring units 100a, 100b perform the network monitoring function.

The network monitoring unit 100a, which is located in the kernel, is provided in a driver between the communication interfaces (NIC) 106a, 106b, 106c, 106d and an IP/ARP (Address Resolution Protocol) 100c. Specifically, packets that are transferred between the communication interfaces (NIC) 106a, 106b, 106c, 106d and the IP/ARP 100c pass through the network monitoring unit 100a at all times. The network monitoring unit 100a monitors information in a layer 3 level (network layer) of the IP/ARP 100c, etc., and also monitors communications according to a protocol of a layer 4 level (transport layer) of a TCP (Transmission Control Protocol) 100d, etc.

The network monitoring unit 100b, which is provided in a user-oriented portion (other than the kernel), is a daemon (background service) for performing a fault information collecting function. Specifically, the network monitoring unit 100b receives a failure detection notice from the network monitoring unit 100a located in the kernel, and accumulates the failure detection notice in fault information 110. The fault information 110 is stored in a storage area of the HDD 103. When the network monitoring unit 100b receives a failure detection notice, the network monitoring unit 100b may accumulate the failure detection notice in the fault information 110 and also transmit the failure detection notice to the management server 300.

The management server 300 periodically collects fault information 110. The management server 300 also collects fault information from other servers. The management server 300 analyzes the contents of the collected fault information 110 to identify a fault location.

The network monitoring units 100a, 100b has functions, to be described below, in order to monitor a communication status.

Figure 5:
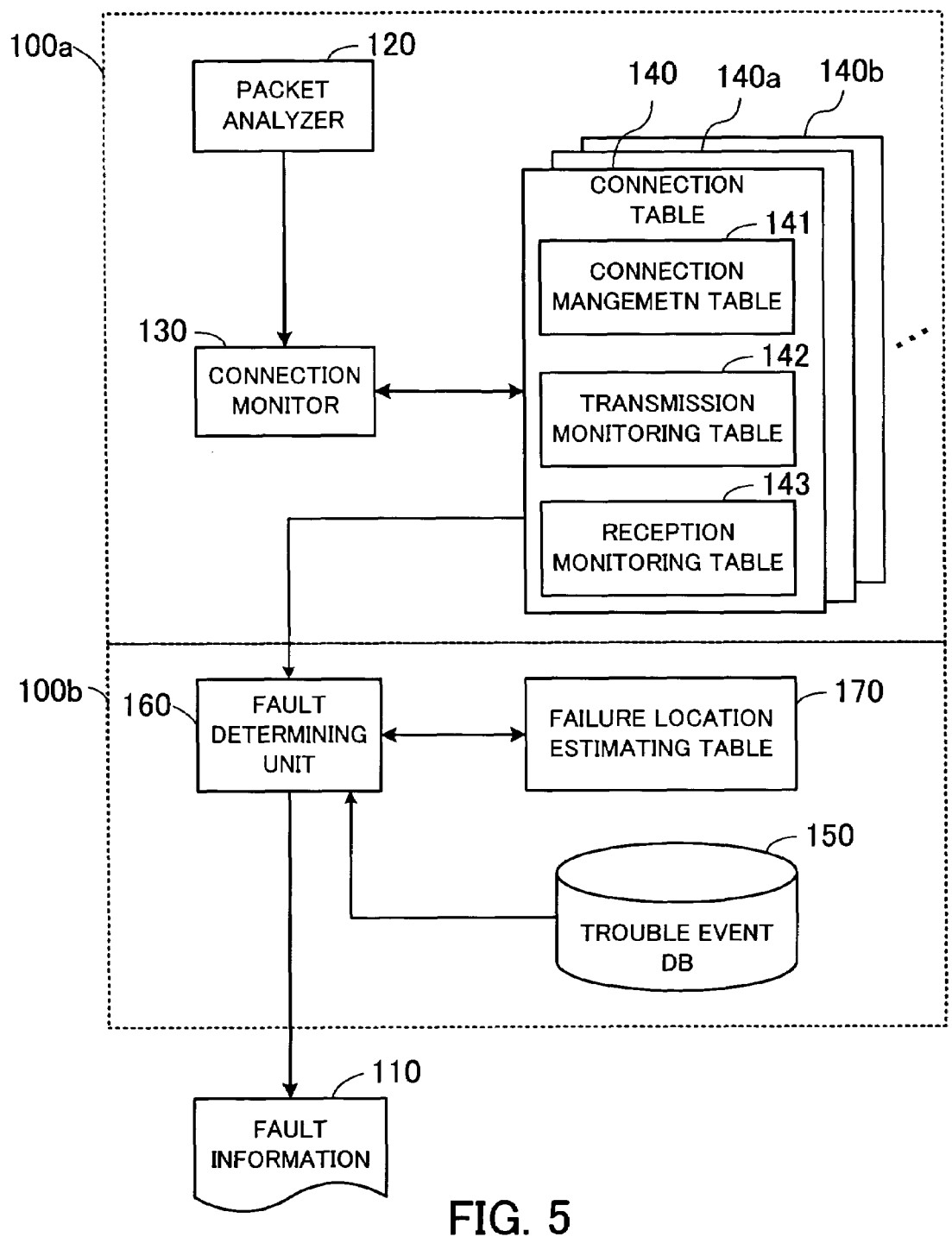
FIG. 5 is a block diagram showing functions of a network monitoring unit.

FIG. 5 is a block diagram showing a function of a network monitoring unit. The network monitoring unit 100a located in the kernel has a packet analyzer 120 and a connection monitor 130.

The packet analyzer 130 analyzes the contents of a communication packet, and gives an analysis result to the connection monitor 130.

Based on the analysis result from the packet analyzer 130, the connection monitor 130 monitors the states of connections and detects a connection failure. The connection monitor 130 uses connection tables 140, 140a, 140b, . . . associated with respective connections for monitoring the connections. The connection tables 140, 140a, 140b, . . . record therein the present states of the respective connections and the occurrence of errors.

For example, the connection table 140 has a connection management table 141, a transmission monitoring table 142, and a reception monitoring table 143. The connection management table 141 registers therein information about companions to which the connection is connected and the occurrence of failures at the connection. The transmission monitoring table 142 successively registers therein information as to whether packets transmitted from the Web server 100 surfer a failure or not. The reception monitoring table 143 successively registers therein information as to whether packets received by the Web server 100 suffer a failure or not.

The network monitoring unit 100b provided in the user-oriented portion has a trouble event DB 150 and a fault determining unit 160. The trouble event DB 150 registered in advance a fault producing condition (one or more events indicative of the occurrence of a fault) and a fault producing location (an element which has caused a fault) at the time the fault producing condition is satisfied.

The fault determining unit 160 refers to the connection tables 140, 140a, 140b, . . . to set an error producing situation in a failure location estimating table 170 based on the contents of a failure that has occurred, e.g., an error or the like. The failure location estimating table 170 registers therein the contents of a failure that has occurred and the number of failures that have occurred, with respect to each of the connections. The fault determining unit 160 compares the contents of the failure location estimating table 170 with the fault producing condition registered in the trouble event DB 150, and detects a connection which has satisfied the fault producing condition. If there is a connection which has satisfied the fault producing condition, then the fault determining unit 160 records the contents of the detected fault in the fault information 110.

Information registered in the trouble event DB 150 will be described in detail below. The trouble event DB 150 registers therein information indicative of the location where a fault has occurred, depending on the contents of the fault. The information indicative of the location where a fault has occurred includes information indicative of hardware that has caused the fault and information indicative of software that has caused the fault.

The information indicative of hardware that has caused the fault represents fault production locations that are segmented based on the connection with the Web server 100.

Figure 6:
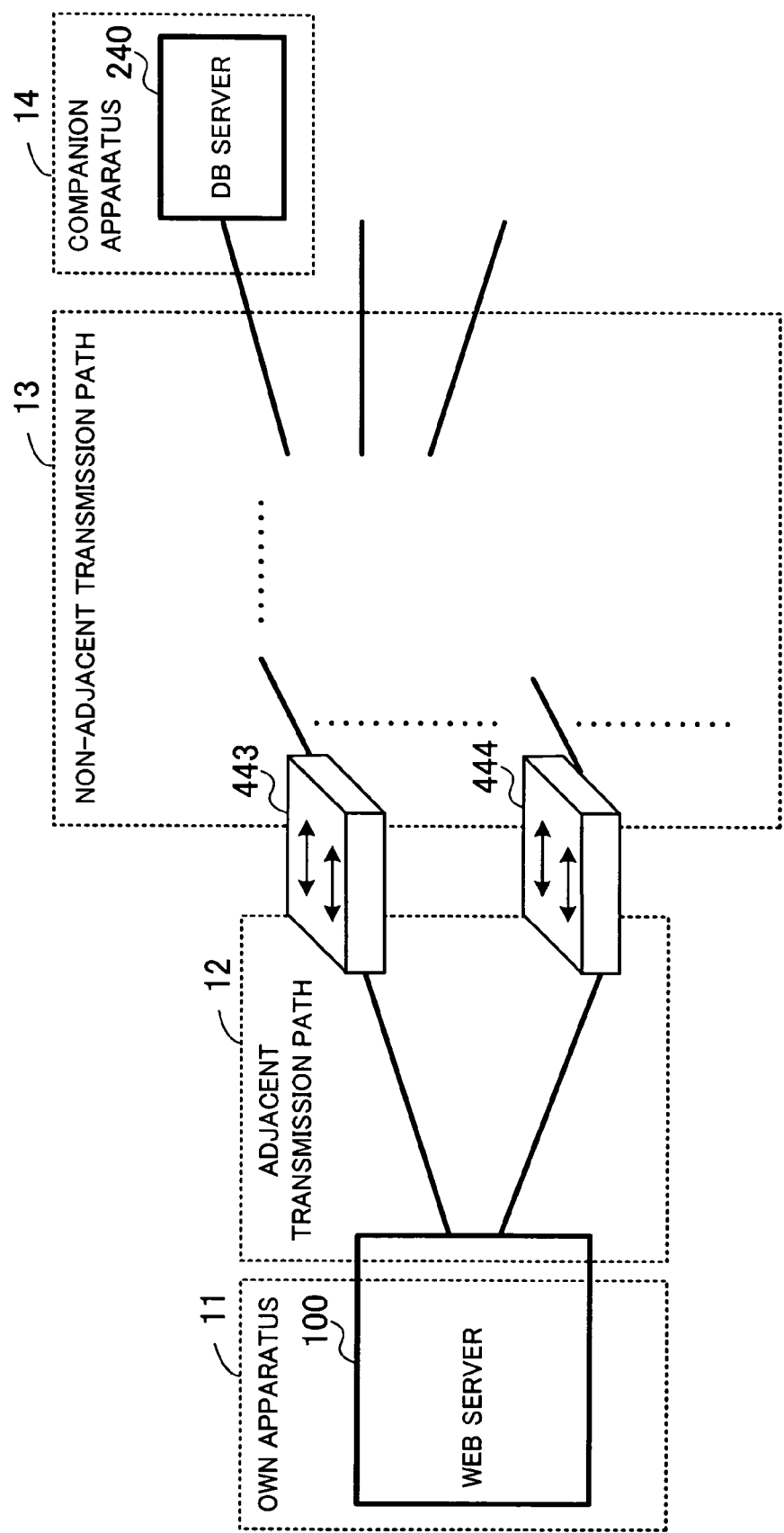
FIG. 6 is a diagram showing a hardware segmentation of fault locations.

FIG. 6 is a diagram showing a hardware segmentation of fault producing locations. Regions indicative of fault producing locations are segmented into the own apparatus 11, an adjacent transmission path 12, a non-adjacent transmission path 13, and the companion apparatus 4. A fault at the own apparatus 11 is a fault that has occurred in the device of the Web server 100 itself, and excludes faults that have occurred at the communication interfaces 106a, 106b, 106c, 106d. A fault at the adjacent transmission path 12 is a fault that has occurred in a communication function between the communication interfaces 106a, 106b, 106c, 106d and the SWs 443, 444. A fault at the non-adjacent transmission path 13 is a fault that has occurred in a communication function between the SWs 443, 444 and the device of a communication companion (e.g., the DB server 240). A fault at the companion apparatus 14 is a fault that has occurred in the device of a communication companion (e.g., the DB server 240).

The information indicative of software that has caused the fault represents communication program layers that are segmented.

Figure 7:
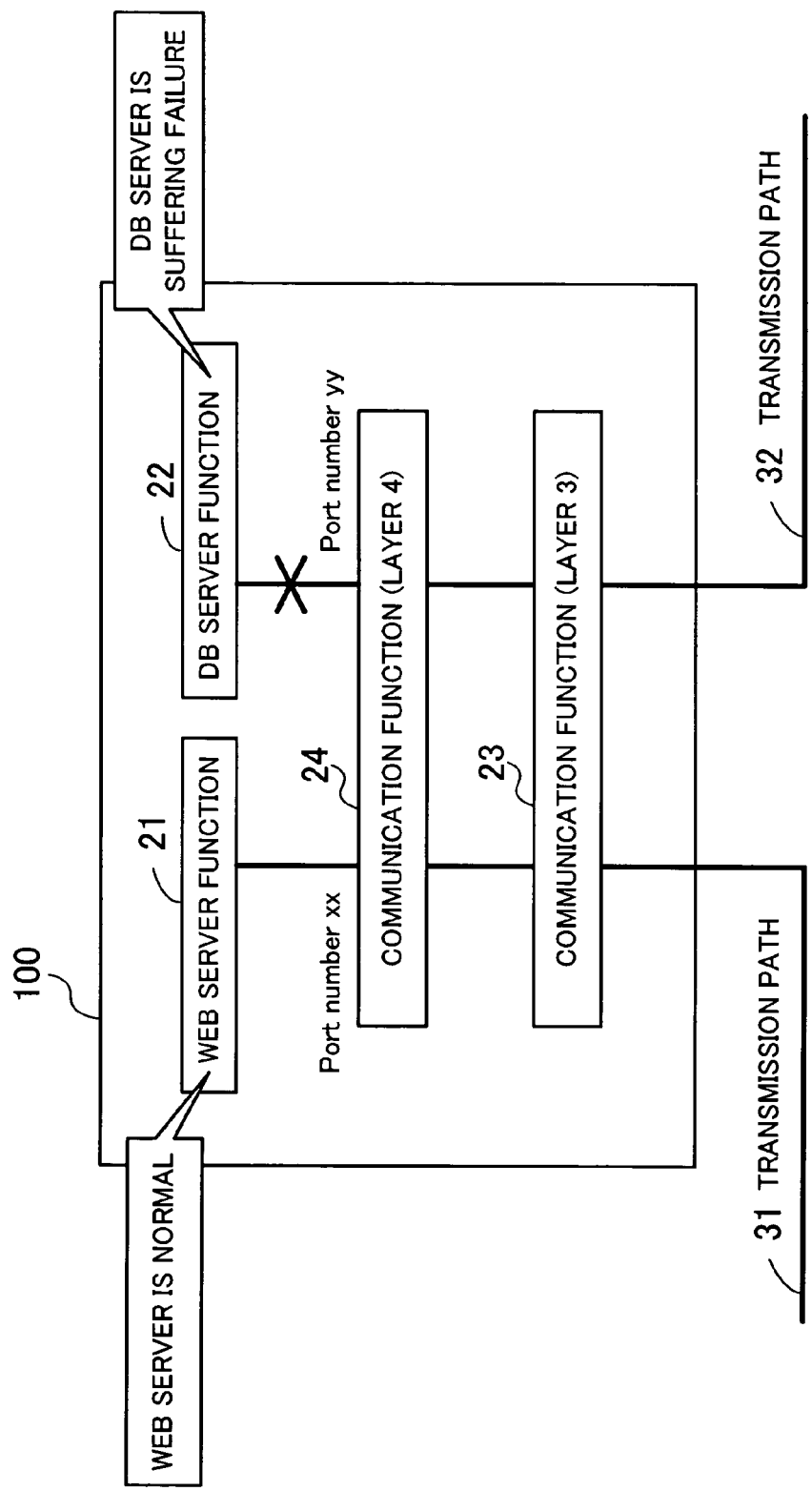
FIG. 7 is a diagram showing a software segmentation of fault locations.

FIG. 7 is a diagram showing a software segmentation of fault producing locations. In FIG. 7, it is assumed that a Web server function 21 and a DB server function 22 are installed in the Web server 100. Packets received via transmission paths 31, 32 are transferred to the Web server function 21 and the DB server function 22 through a communication function 23 of a layer 3 (network layer) and a communication function 24 of a layer 4 (transport layer).

A fault that has occurred in the communication function 23 of the layer 3, the communication function 24 of the layer 4, and faults that have occurred in application functions such as the Web server function 21, the DB server function 22, etc. are segmented. For example, if the DB server function 22 suffers a fault, then it is recognized that communications to the Web server function 21 are performed normally, but communications to the DB server function 22 are not performed normally, by monitoring ports corresponding to the Web server function 21 and the DB server function 22. Consequently, it can easily be estimated that the communication functions 23, 24 are normal, but the DB server function 22 suffers a failure.

In order to determine such a fault production location, the trouble event DB 150 registers therein information indicative of hardware fault production locations or software fault production locations in association with fault detecting conditions.

FIG. 8 is a diagram showing a data structure of the trouble event DB 150. As shown in FIG. 8, the trouble event DB 150 has a fault producing equipment classification table 151 and a fault producing function classification table 152.

The fault producing equipment classification table 151 registers therein fault detecting conditions and information indicative of fault producing hardware locations. Specifically, the fault producing equipment classification table 151 has a vertical column of fault detecting conditions and a vertical column of fault producing equipment. In the fault producing equipment classification table 151, items of information in each of horizontal rows across the vertical rows are related to each other.

The column of fault detecting conditions contains conditions for deciding on the occurrence of faults. The column of fault producing equipment contains regions to which pieces of equipment that have caused faults belong. For example, those regions represent the own apparatus, the adjacent transmission path, the non-adjacent transmission path, and the companion apparatus.

Fault producing locations can be sorted out by referring to the fault producing equipment classification table 151. For example, the connection monitor 130 monitors a communication interface, an IP address, and a port number of its own apparatus and also a communication interface, an IP address, and a port number of the companion apparatus. Then, the connection monitor 130 acquires information as to whether there is a connection or not (a connection is established or not). The fault determining unit 160 monitors whether there is a retransmitted packet or not, there is a duplicate received packet or not, there is lost data or not, an Ack (acknowledgment) response time, and a reset signal, and statistically processes these monitored information. In this manner, it is determined which one of the own server, the adjacent transmission path, the non-adjacent transmission path, and the companion server is suffering trouble.

FAULT EXAMPLE 1

If the Ack response time of the own apparatus is longer than a reference value, then the connection monitor 130 detects a response delay. The fault determining unit 160 detects a fault based on the first record in the fault producing equipment classification table 151. At this time, since the "own apparatus" is registered as fault producing equipment in the record, the fault determining unit 160 judges that the own server is having some problem.

FAULT EXAMPLE 2

When all the connections with respect to the communication interfaces of the own server suffer a failure (a retransmitted packet, a duplicated received packet, lost data, or a response delay), the connection monitor 130 detects a connection failure. The fault determining unit 160 detects a fault based on the second record in the fault producing equipment classification table 151. At this time, since the "adjacent transmission path" is registered as fault producing equipment in the record, the fault determining unit 160 judges that the adjacent transmission path is having a failure.

FAULT EXAMPLE 3

If some connections are subjected to a failure at an unidentified IP address or port, then the connection monitor 130 detects such a connection failure. The fault determining unit 160 detects a fault based on the third record in the fault producing equipment classification table 151. At this time, since the "non-adjacent transmission path" is registered as fault producing equipment in the record, the fault determining unit 160 judges that an error has occurred in the non-adjacent transmission path.

FAULT EXAMPLE 4

If a failure has occurred at a certain companion IP address or port when a connection is established, then the connection monitor 130 detects such a connection failure. The fault determining unit 160 detects a fault based on the fourth record in the fault producing equipment classification table 151. At this time, since the "companion apparatus" is registered as fault producing equipment in the record, the fault determining unit 160 judges that the server of the companion apparatus is suffering a failure.

As described above, fault production locations can be classified in terms of hardware based on the fault producing equipment classification table 151.

The fault producing function classification table 152 registers therein fault detecting conditions and information indicative of fault producing software locations. Specifically, the fault producing function classification table 152 has a vertical column of fault detecting conditions and a vertical column of fault producing functions. In the fault producing function classification table 152, items of information in each of horizontal rows across the vertical rows are related to each other.

The column of fault detecting conditions contains conditions for deciding on the occurrence of faults. The column of fault producing functions contains regions to which functions that have caused faults belong. For example, those regions represent the application, the network monitoring unit, etc.

Fault producing locations can be sorted out by referring to the fault producing function classification table 152. Specifically, the connection monitor 130 generally determines and monitors the information of not only a certain single layer but also a plurality of layers. The fault determining unit 160 compares the monitored results with the fault producing function classification table 152 to detect partial faults as described below.

FAULT EXAMPLE 5

If a connection is established in an IP level, but not at each port, then the connection monitor 130 detects such a connection failure. The fault determining unit 160 detects a fault based on the first record in the fault producing function classification table 152. At this time, since the "application apparatus" is registered as fault producing function in the record, the fault determining unit 160 judges that the application is suffering a failure.

FAULT EXAMPLE 6

If a connection is normally established between the own apparatus and the companion apparatus, but the monitoring function (ICMP function) of a network apparatus is suffering a failure and there is no response based on a ping command, then the connection monitor 130 detects such a connection failure. The fault determining unit 160 detects a fault based on the second record in the fault producing function classification table 152. At this time, since the "network monitor" is registered as fault producing function in the record, the fault determining unit 160 judges that the ICMP function of the network apparatus is suffering a partial failure.

Since a fault location is generally determined based on the results of the monitoring of a plurality of layers, it can be judged whether the fault is occurring at an application level or in a network monitor.

According to the fault detecting process performed by the fault determining unit 160, the fault determining unit 160 can detect a fault symptom which occurs before a fault is recognized. For example, because the network is controlled by itself, even if a problem (a retransmission or the like) arises at the TCP level, the system is automatically recovered from the problem, and the fault is not detected. However, a problem (a retransmission or the like) may frequently arise at the TCP level as a fault symptom. Heretofore, it has not been customary to detect a fault based on a problem (a retransmission or the like) at the TCP level, the system administrator has usually been unable to recognize a system failure until a serious problem occurs in the system.

According to the present embodiment, the connection monitor 130 monitors information which cannot usually be confirmed that represents a problem (a retransmission or the like) at the TCP level from which the system is automatically recovered. The fault determining unit 160 then estimate a trouble symptom based on the monitored information.

Figure 9:
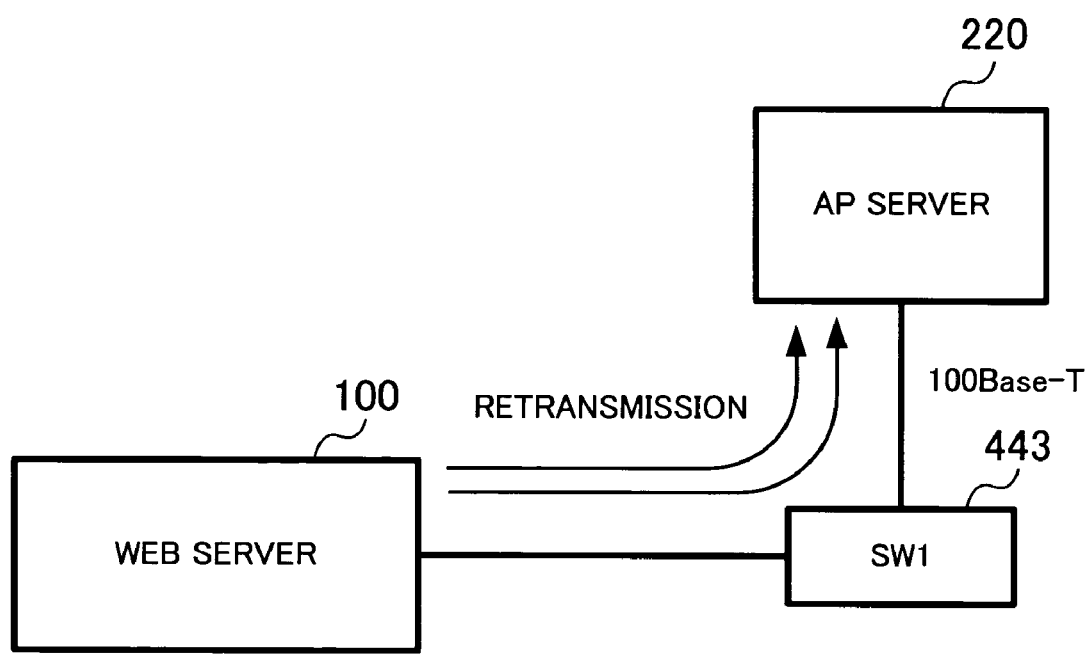
FIG. 9 is a block diagram illustrative of an example in which a trouble symptom is estimated.

FIG. 9 is a block diagram illustrative of an example in which a trouble symptom is estimated. It is assumed that a packet transmitted from the Web server 100 to the AP server 220 does not reach the AP server 220 in one process, but is retransmitted.

Usually, when a packet is transmitted from the Web server 100 to the AP server 220, such a retransmission is not considered as the occurrence of a failure. However, a retransmission of a packet from the Web server 100 to the AP server 220 means that the packet has been lost in the transmission path or a server. If such a retransmission of a packet occurs highly frequently, then it tends to lead to a serious trouble. For example, if a packet is frequently transmitted from the Web server 100 to the AP server 220, then the AP server 220 may possibly have started suffering a CPU capability shortage. However, the system administrator may take a suitable countermeasure before a serious trouble happens to the system if such a trouble symptom is detected and given as fault information to the system administrator.

A process of detecting a fault and a symptom thereof will be described below.

Figure 10:
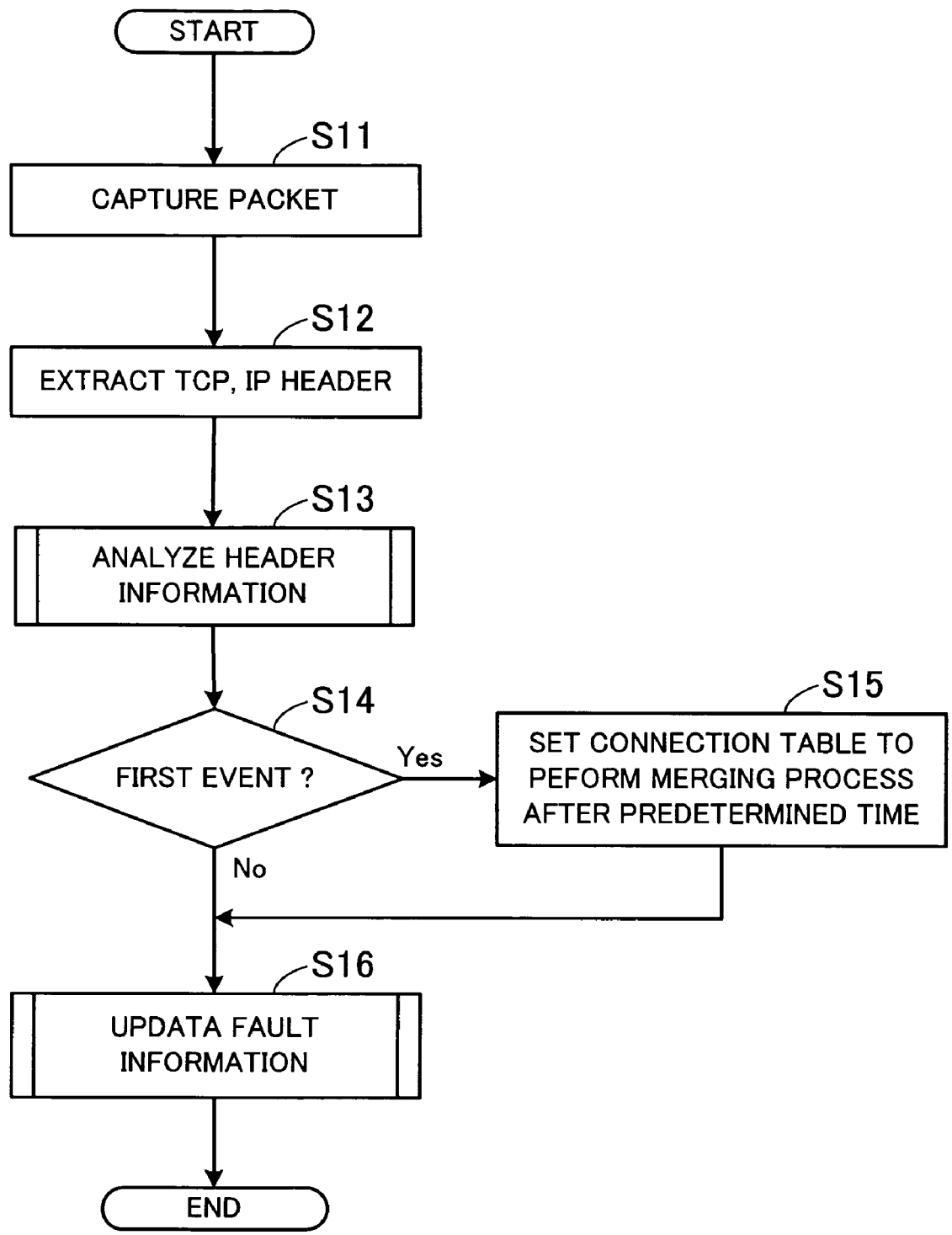
FIG. 10 is a flowchart of a network monitoring sequence.

FIG. 10 is a flowchart of a network monitoring sequence. The network monitoring sequence will be described below in the order of step numbers shown in FIG. 10. The network monitoring sequence described below is executed each time communications with another apparatus are performed.

[STEP S11] The packet analyzer 120 captures a connection, i.e., acquires a packet transmitted through a connection that has been established with the other apparatus.

[STEP S12] The packet analyzer 120 extracts TCP and IP headers from the captured packet.

[STEP S13] The packet analyzer 120 analyzes the extracted header information. Details of the analyzing process will be described later.

[STEP S14] The connection monitor 130 determines whether the present process is a first event or not. If there is not a connection table being updated which corresponds to the connection, then the present process can be judged as a first event. If the present process is a first event, then control goes to STEP S15. If not, then control goes to STEP S16.

[STEP S15] The connection monitor 130 sets the state of a corresponding connection table such that fault information detected based on the contents of the connection table is merged (added and combined) into the fault information 110 after a predetermined period of time.

[STEP S16] The fault determining unit 160 detects a fault based on the connection table 140, and updates (merges) the fault information 110 based on the detected result. Details of this process will be described later.

The process of analyzing header information will be described below.

Figure 11:
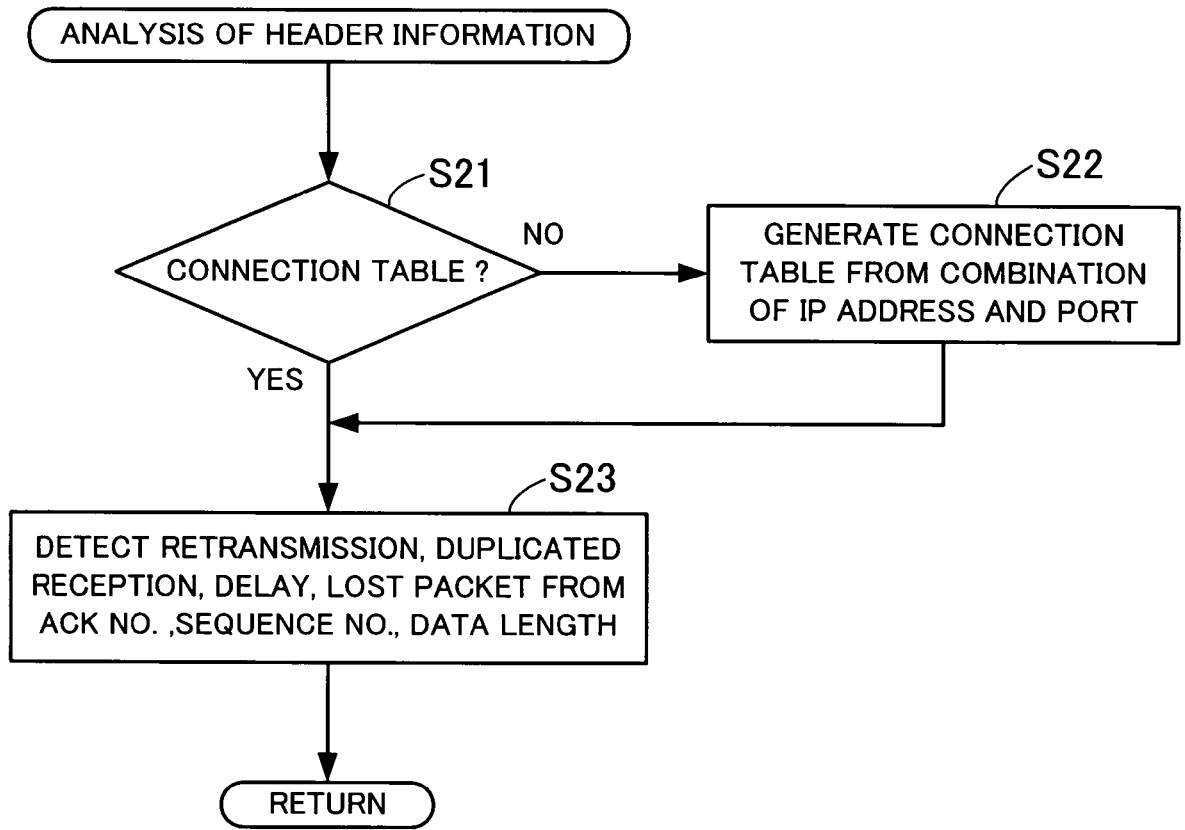
FIG. 11 is a flowchart of a header information analyzing sequence.

FIG. 11 is a flowchart of a header information analyzing sequence. The header information analyzing sequence will be described below in the order of step numbers shown in FIG. 11.

[STEP S21] The connection monitor 130 determines whether there is a connection table corresponding to the acquired packet or not. If there is a connection table, then control goes to STEP S23. If there is not a connection table, then control goes to STEP S22.

[STEP S22] The connection monitor 130 generates a connection table corresponding to a combination of an IP address and a port number. The generated connection table is stored in a storage area of the RAM 102, for example.

[STEP S23] The connection monitor 130 detects a retransmission, a duplicated reception, a delay, or a lost packet based on a response (Ack) number, a sequence number, and a data length. The detected result is registered in the connection table. Thereafter, control goes back to the sequence shown in FIG. 10, where STEP S14 is executed.

A specific example in which a connection table is generated based on packets transmitted and received through a certain connection will be described below.

Figure 12:
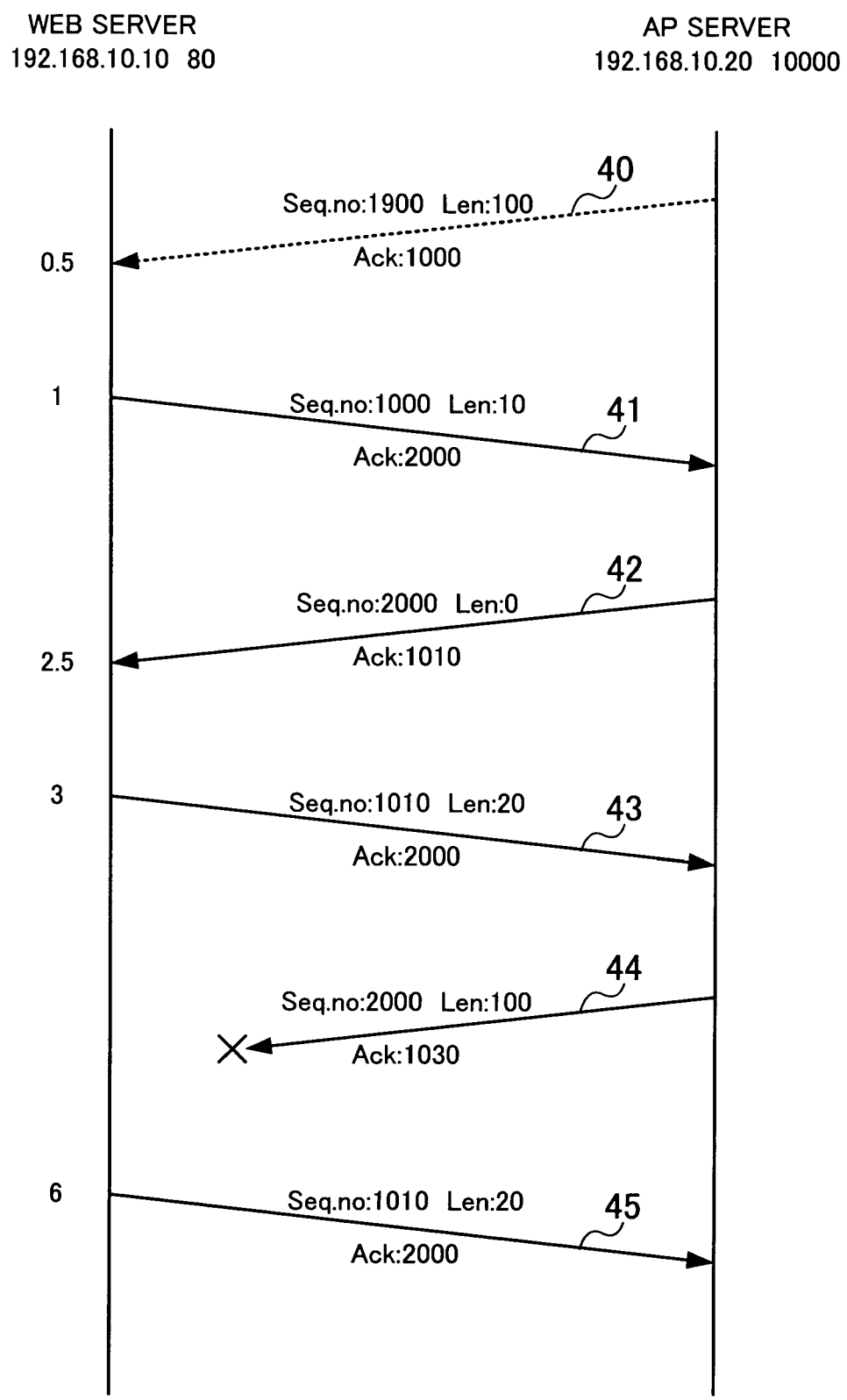
FIG. 12 is a diagram showing an example of communications on a connection.

FIG. 12 is a diagram showing an example of communications on a connection. In the example shown in FIG. 12, a connection established between the Web server 100 and the AP server 220 is monitored by the network monitoring function that is installed in the Web server 100. The Web server 100 has an IP address "192.168.10.10" and the application which provides the function of the Web server has a port number "80". The AP server 220 has an IP address "192.168.10.20" and the application which provides the processing function thereof has a port number "10000".

Attention is given to packets 40 through 45 that are transferred between the Web server 100 and the AP server 220. The contents of the packets 40 through 45 will be described below with reference to FIG. 13. It is assumed that the packet 44 is not properly transmitted due to some fault.

FIG. 13 is a diagram showing the contents of packets on the Web server. FIG. 13 illustrates communication states (normal or abnormal) recognized by the Web server 100, times (measured from the start of the monitoring process) for transmitting and receiving packets at the Web server 100, SRC-IP addresses (source IP addresses), SRC-Port numbers (source port numbers), DST-IP addresses (destination IP addresses), DST-Port numbers (destination port numbers), Sequence no. (sequence numbers), Ack no. (response numbers), and Data Len. (data lengths) with respect to the packets 40 through 45.

The packet 40 has a normal communication state, a transmitting and receiving time of 0.5 second, an SRC-IP address "192.168.10.20", an SRC-Port number "10000", a DST-IP address "192.168.10.10", a DST-Port number "80", a Sequence no. of "1900", an Ack no. of "1000", and a Data Leg. of 100 bytes.

The packet 41 has a normal communication state, a transmitting and receiving time of 1.0 second, an SRC-IP address "192.168.10.10", an SRC-Port number "80", a DST-IP address "192.168.10.20", a DST-Port number "10000", a Sequence no. of "1000", an Ack no. of "2000", and a Data Leg. of 10 bytes.

The packet 42 has a normal communication state, a transmitting and receiving time of 2.5 seconds, an SRC-IP address "192.168.10.20", an SRC-Port number "10000", a DST-IP address "192.168.10.10", a DST-Port number "80", a Sequence no. of "2000", an Ack no. of "1010", and a Data Leg. of 0 bytes.

The packet 43 has a normal communication state, a transmitting and receiving time of 3.0 seconds, an SRC-IP address "192.168.10.10", an SRC-Port number "80", a DST-IP address "192.168.10.20", a DST-Port number "10000", a Sequence no. of "1010", an Ack no. of "2000", and a Data Leg. of 20 bytes.

The packet 44 is a packet that has failed to reach the Web server 100 for some reasons. In FIG. 13, therefore, the communication state and the time for the packet 44 are left blank. The packet 44 has an SRC-IP address "192.168.10.20", an SRC-Port number "10000", a DST-IP address "192.168.10.10", a DST-Port number "80", a Sequence no. of "2000", an Ack no. of "1030", and a Data Leg. of 100 bytes. Since the packet 44 has not reached the Web server 100, the Web server 100 retransmits the packet 45 whose contents are identical to those of the packet 43 based on the function of the TCP protocol.

The packet 45 has an abnormal communication state, a transmitting and receiving time of 6.0 seconds, an SRC-IP address "192.168.10.10", an SRC-Port number "80", a DST-IP address "192.168.10.20", a DST-Port number "10000", a Sequence no. of "1010", an Ack no. of "2000", and a Data Leg. of 20 bytes.

The packet analyzer 120 of the Web server 100 analyzes the header information of the packets 41 through 43, 45 that have actually been input and output, and transfer the analyzed information (the information shown in FIG. 13) to the connection monitor 130. Based on the received information, the connection monitor 130 generates a connection table 140. As shown in FIG. 5, the connection table 140 is made up of a connection management table 141, a transmission monitoring table 142, and a reception monitoring table 143. Data structures of these tables will be described below.

FIG. 14 is a diagram showing a data structure of the connection management table 141. As shown in FIG. 14, the connection management table 141 registers therein an interface name, an own apparatus IP, an own apparatus Port, a companion apparatus IP, a companion apparatus Port, a retransmission counter, a duplicated reception counter, a lost packet counter, a response delay counter, a packet size counter, a packet number counter, a companion apparatus response time reference, and an own apparatus response time reference.

The interface name represents identifying information of a communication interface which has established a connection. In the example shown in FIG. 14, the interface name is "hme0".

The own apparatus IP represents the IP address of the own apparatus. In the example shown in FIG. 14, the IP address is "192.168.10.10".

The own apparatus Port represents the port number of an application which uses the connection. In the example shown in FIG. 14, the port number is "80".

The companion apparatus IP represents the IP address of the companion apparatus. In the example shown in FIG. 14, the IP address is "192.168.10.20".

The companion apparatus Port represents the port number of an application of the companion apparatus which uses the connection. In the example shown in FIG. 14, the port number is "10000".

The retransmission counter represents the number of times that a packet is retransmitted. In the example shown in FIG. 14, a packet is retransmitted once.

The duplicated reception counter represents the number of times that one packet is received in a duplicated fashion. In the example shown in FIG. 14, no duplicated packet is received.

The lost packet counter represents the number of times that a packet is lost. In the example shown in FIG. 14, no packet is lost.

The response delay counter represents the number of times that a time which has been spent after the own apparatus receives a packet until it returns a response to the companion apparatus exceeds a reference value. A response delay occurs if the processing load on the own apparatus is excessively large. Therefore, the occurrence of a fault due to an increased processing load on the own apparatus by counting response delays is detected. In the example shown in FIG. 14, no response delay occurs.

The packet size counter represents the total size of received packets. In the example shown in FIG. 14, the packet size counter has a value of "0".

The packet number counter represents the total number of packets that have been transmitted and received. In the example shown in FIG. 14, the packet number counter has a value of "0".

The companion apparatus response time reference represents a time for waiting for a response from the companion apparatus. If there is no response from the companion apparatus during this time, then the situation is judged as a response delay and the response delay counter is counted up. In the example shown in FIG. 14, the companion apparatus response time reference is "1.5 seconds".

The own apparatus response time reference represents a time allowed for the own apparatus to return a response to the companion apparatus. If the own apparatus fails to return a response to the companion apparatus during this time, then a response delay is detected. In the example shown in FIG. 14, the own apparatus response time reference is "0.5 second".

FIG. 15 is a diagram showing a data structure of the transmission monitoring table 142. The transmission monitoring table 142 has vertical columns of sequence number predictions, times, and companion apparatus response times.

The column of sequence number predictions contains a predicted value of the sequence number of a packet to be transmitted next to the companion apparatus. A value representative of the sum of the sequence number of a previously transmitted packet and a data length serves as a predicted value of the sequence number of a packet to be transmitted next. If the sequence number of a packet that is transmitted next is smaller than the predicted value of the sequence number, then it can be understood that the packet has been retransmitted.

The time represents a time in which the own apparatus has transmitted a packet (a time that has elapsed from the start of the monitoring of a connection). The companion apparatus response time represents a time that has elapsed from the time when a packet is transmitted to the companion apparatus until the time when a response is received from the companion apparatus in acknowledgment of the packet.

FIG. 16 is a diagram showing a data structure of the reception monitoring table 143. The reception monitoring table 143 has vertical columns of a sequence number prediction, a time, and an own apparatus response time.

The column of a sequence number prediction contains a predicted value of the sequence number of a packet to be received next from the companion apparatus. A value representative of the sum of the sequence number of a previously received packet and a data length serves as a predicted value of the sequence number of a packet to be received next. If the sequence number of a packet that is received next is smaller than the predicted value of the sequence number, then it can be understood that the packet has been received in a duplicated fashion.

The time represents a time in which a packet is received from the companion apparatus (a time that has elapsed from the start of the monitoring of a connection). The own apparatus response time represents a time that has elapsed from the time when a packet is received until the time when the own apparatus responds to the received packet.

State transitions of the transmission monitoring table 142 and the reception monitoring table 143 at the time communications shown in FIG. 12 are performed (the contents of packets are shown in FIG. 13) will be described below.

Figure 17:
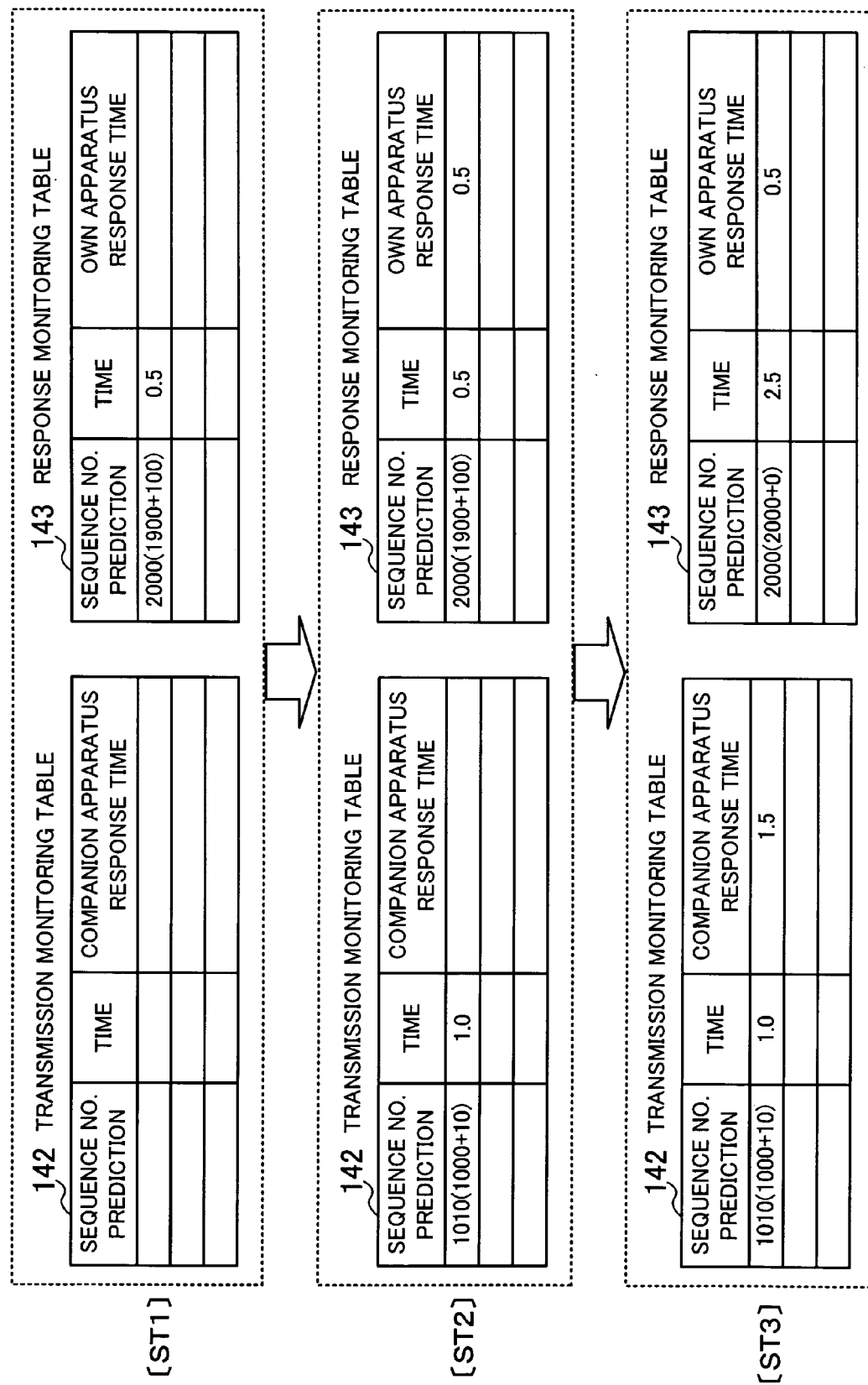
FIG. 17 is a first diagram showing state transitions of the transmission monitoring table and the reception monitoring table.

FIG. 17 is a first diagram showing state transitions of the transmission monitoring table 142 and the reception monitoring table 143. A state ST1 represents a state immediately after the packet 40 shown in FIG. 12 is received (at the time of 0.5 second). When the Web server 100 receives the packet 40, the connection monitor 130 predicts a sequence number on the reception side, and adds a record to the reception monitoring table 143.

In the example shown in FIG. 17, "2000" (a value representing the sum of the sequence number "1900" of the packet 40 and the data length "100") is set in the column of sequence number predictions, and "0.5" is set in the column of times.

A state ST2 represents a state immediately after the packet 41 shown in FIG. 12 is transmitted (at the time of 1.0 second). When the Web server 100 transmits the packet 41, the connection monitor 130 predicts a sequence number on the transmission side, and adds a record to the transmission monitoring table 142. At the same time, the connection monitor 130 sets a value in the column of own apparatus response times in the reception monitoring table 143.

In the example shown in FIG. 17, "1010" (a value representing the sum of the sequence number "1000" of the packet 41 and the data length "10") is set in the column of sequence number predictions, and "1.0" is set in the column of times in the transmission monitoring table 142. "0.5" (a value produced by subtracting the time "0.5" in the reception monitoring table 143 from the time "1.0" in the transmission monitoring table 142) is set in the column of own apparatus response times in the reception monitoring table 143.

A state ST3 represents a state immediately after the packet 42 shown in FIG. 12 is received (at the time of 2.5 seconds). When the Web server 100 receives the packet 42, the connection monitor 130 predicts a sequence number on the reception side, and updates the reception monitoring table 143. At the same time, the connection monitor 130 sets a value in the column of companion apparatus response times in the transmission monitoring table 142.

In the example shown in FIG. 17, "2000" (a value representing the sum of the sequence number "2000" of the packet 42 and the data length "0") is set in the column of sequence number predictions, and "2.5" is set in the column of times in the reception monitoring table 143. "1.5" (a value produced by subtracting the time "1.0" in the transmission monitoring table 142 from the time "2.5" in the reception monitoring table 143) is set in the column of companion apparatus response times in the transmission monitoring table 142.

Since the sequence number of the packet 42 is in conformity with the previously predicted sequence number, it is judged that no failure has occurred.

Figure 18:
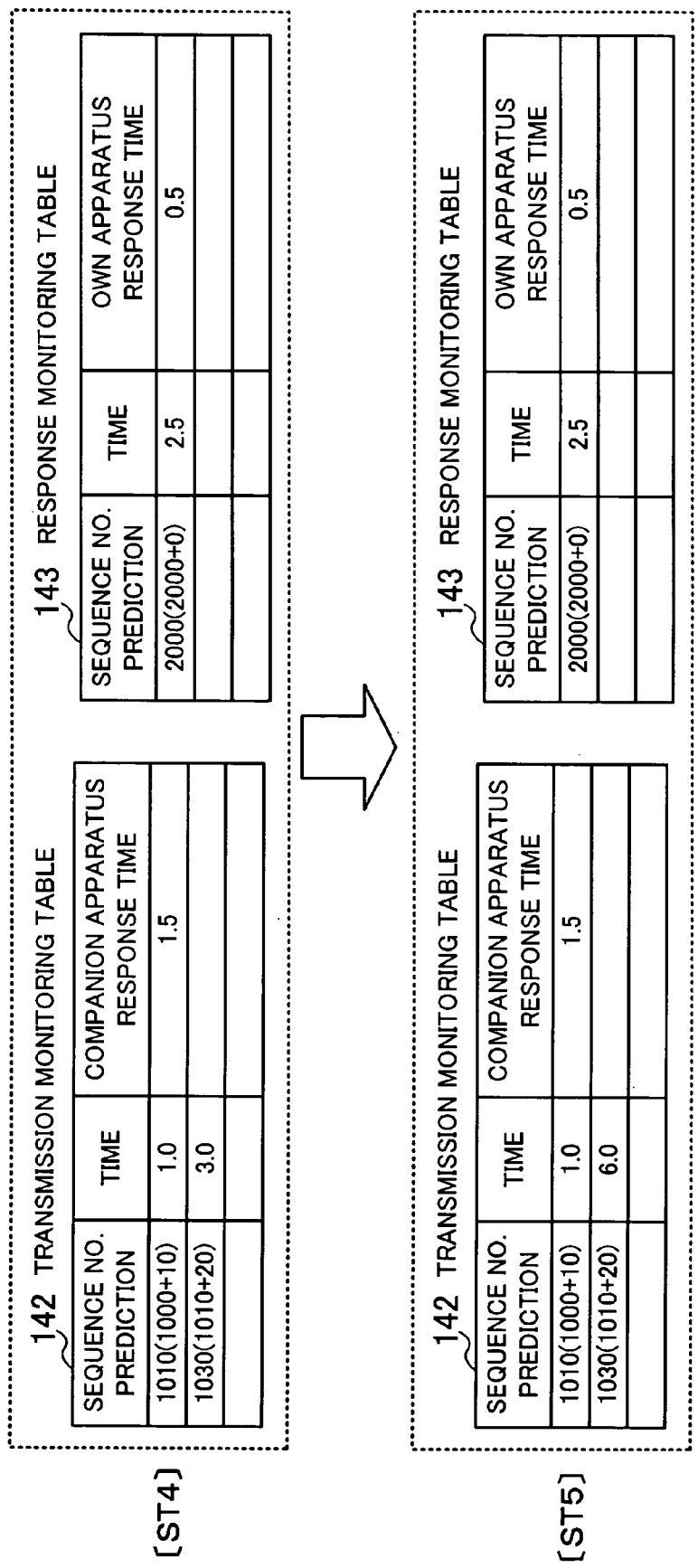
FIG. 18 is a second diagram showing state transitions of the transmission monitoring table and the reception monitoring table.

FIG. 18 is a second diagram showing state transitions of the transmission monitoring table 142 and the reception monitoring table 143.

A state ST4 represents a state immediately after the packet 43 shown in FIG. 12 is transmitted (at the time of 3.0 seconds). When the Web server 100 transmits the packet 43, the connection monitor 130 predicts a sequence number on the transmission side, and updates the transmission monitoring table 142. At the same time, the connection monitor 130 sets a value in the column of own apparatus response times in the reception monitoring table 143.

In the example shown in FIG. 18, "1030" (a value representing the sum of the sequence number "1010" of the packet 43 and the data length "20") is set in the column of sequence number predictions, and "3.0" is set in the column of times as a new record in the transmission monitoring table 142. "0.5" (a value produced by subtracting the time "2.5" in the reception monitoring table 143 from the time "3.0" newly set in the transmission monitoring table 142) is set in the column of own apparatus response times in the reception monitoring table 143.

Since the sequence number of the packet 43 is in conformity with the previously predicted sequence number, it is judged that no failure has occurred.

A state ST5 represents a state immediately after the packet 45 shown in FIG. 12 is transmitted (at the time of 6.0 seconds). When the Web server 100 transmits the packet 45, the connection monitor 130 predicts a sequence number on the transmission side, and updates the transmission monitoring table 142.

In the example shown in FIG. 18, "1030" (a value representing the sum of the sequence number "1010" of the packet 45 and the data length "20") is set in the column of sequence number predictions, and "6.0" is set in the column of times in the transmission monitoring table 142.

Having detected the transmission of the packet 45, the connection monitor 130 detects that the sequence number "1010" of the packet 45 is smaller than the sequence number "1030" which has already been set in the transmission monitoring table 142. The connection monitor 130 thereby judges that the packet 45 is a packet for retransmission. The connection monitor 130 now updates the value of the retransmission counter in the connection management table 141.

In this manner, the connection table 140 is updated. The fault determining unit 160 determines whether there is a fault at each connection or not based on the information contained in the connection table 140. If a fault is detected, then the fault determining unit 160 updates the fault information.

Figure 19:
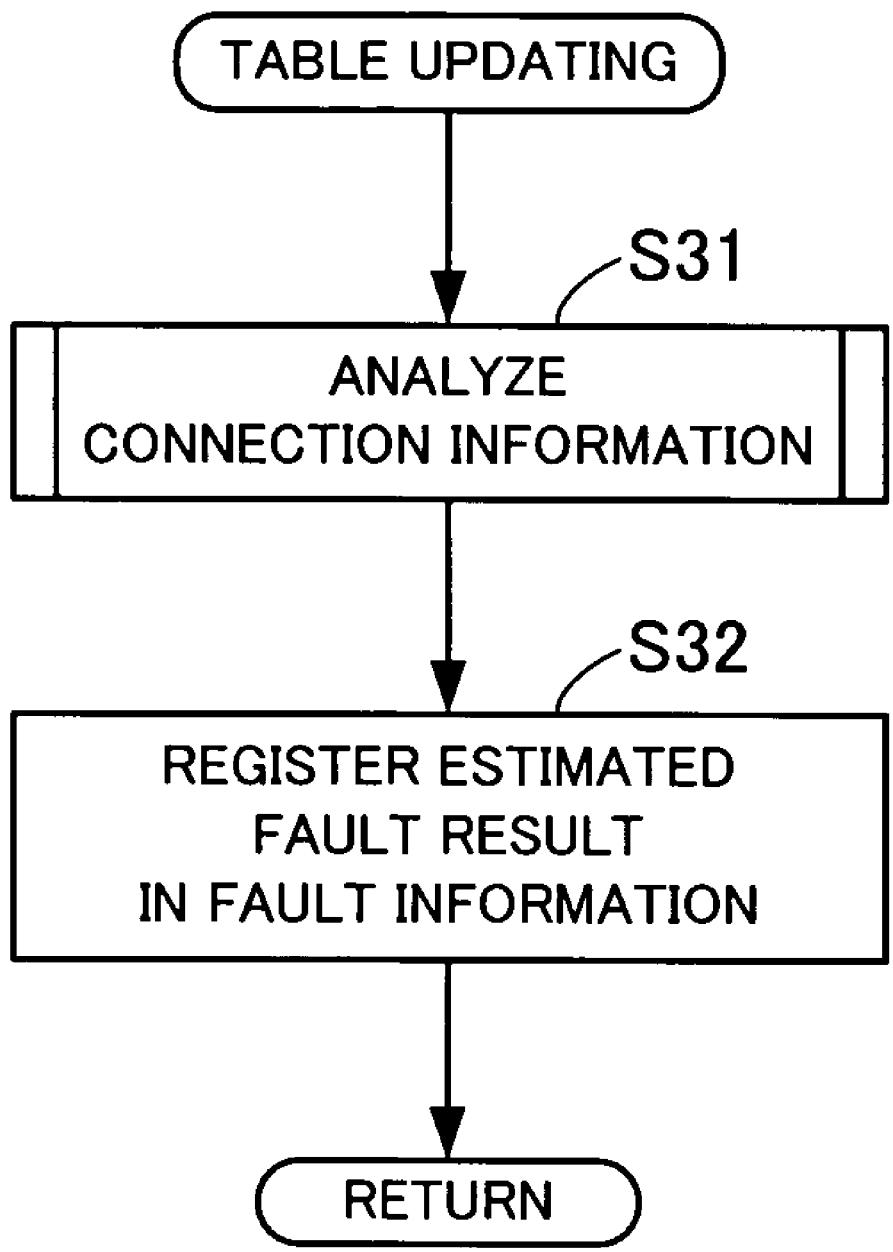
FIG. 19 is a flowchart of a fault information updating sequence.

FIG. 19 is a flowchart of a fault information updating sequence. The fault information updating sequence will be described below in the order of step numbers shown in FIG. 19.

[STEP S31] The fault determining unit 160 analyzes connection information. Details of the connection information analyzing process will be described in detail later.

[STEP S32] The fault determining unit 160 registers an estimated fault result in the fault information.

Figure 20:
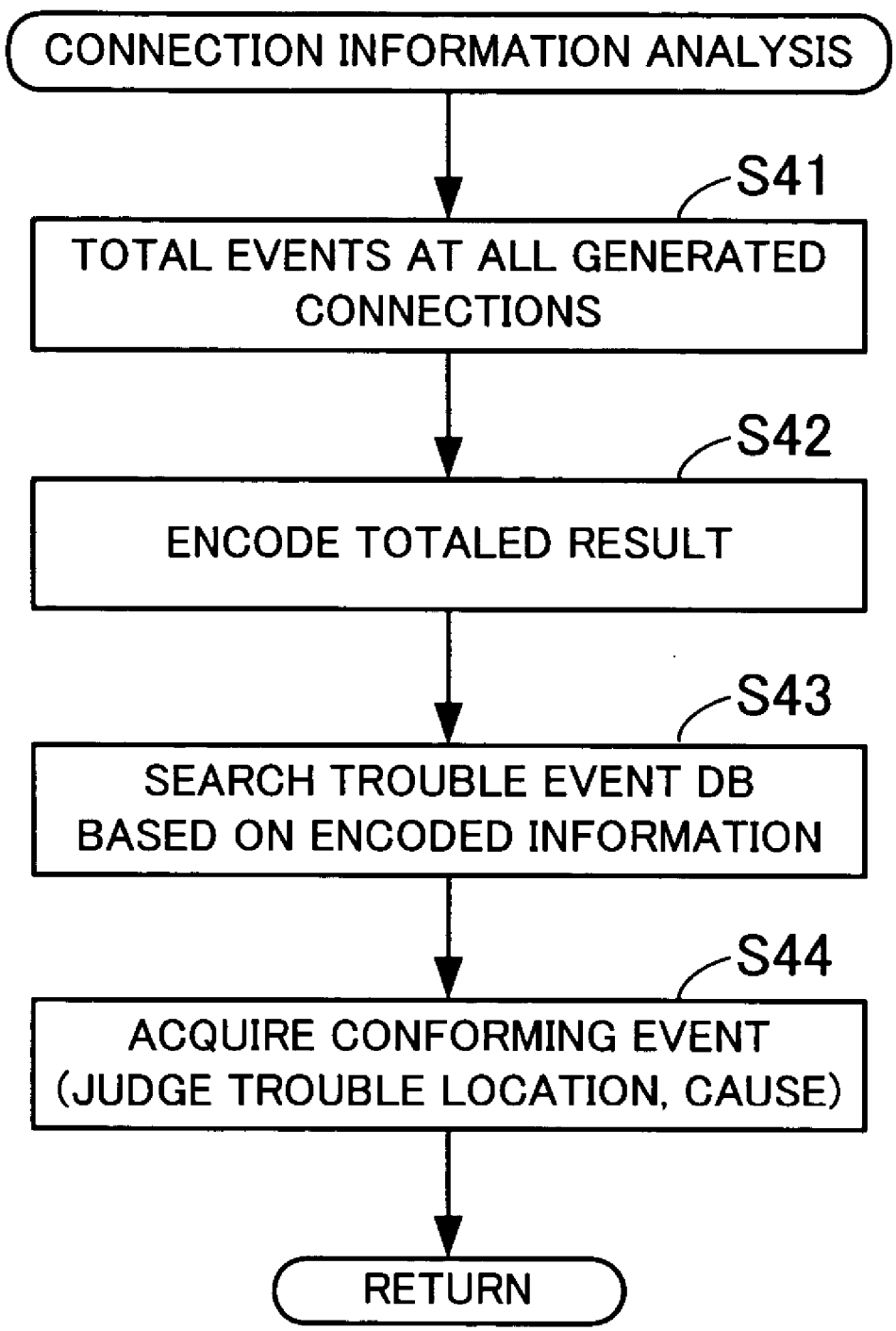
FIG. 20 is a flowchart of a connection information analyzing sequence.

FIG. 20 is a flowchart of the connection information analyzing sequence. The connection information analyzing sequence will be described below in the order of step numbers shown in FIG. 20.

[STEP S41] The fault determining unit 160 totals the events of all generated connections.

[STEP S42] The fault determining unit 160 generates a failure location estimating table 170, and encodes the totaled result (the encoded information will hereinafter referred to as "status code").

[STEP S43] The fault determining unit 160 searches the trouble event DB 150 based on the status code.

[STEP S44] The fault determining unit 160 detects a corresponding trouble event in the trouble event DB 150, and determines a trouble location and a cause of the trouble.

FIG. 21 is a diagram showing a data structure of the failure location estimating table 170. The failure location estimating table 170 has vertical columns of connections, normal packets, and failures. In the failure location estimating table 170, items of information in each of horizontal rows across the vertical rows are related to each other.

The column of connections contain identifying information for uniquely identifying connections. The column of normal packets contains the number of packets that have been communicated normally. The column of failures contains the types of failures (events) and the numbers thereof at the time those events are detected.

In the example shown in FIG. 21, a retransmission, a duplicated reception, a lost packet, a transmission-side response delay, and a reception-side response delay are provided as the types of events in the column of failures. The numbers of times that those events have occurred are set for each connection.

The failure location estimating table 170 is generated when events are totaled from the connection table 140. After the failure location estimating table 170 is generated, flags indicative of the generation of events for corresponding connections are cleared, initializing the connection table 140. The failure location estimating table 170 is generated for each interface.

A status code is generated based on the failure location estimating table 170.

FIG. 22 is a diagram showing an example of a status code. In the example shown in FIG. 22, a status code 171 corresponding to a retransmission, a duplicated reception, a lost packet, a transmission-side response delay, and a reception-side response delay is established. The status code has values having respective meanings as shown below.

0: There is no traffic at a connection.
1: There is a normal connection.
2: There is a failure event at a particular IP address (there is no normal connection).
3: There is a failure event at a particular IP address (there is a normal connection).
4: There is a failure event at a plurality of IP addresses (there is no normal connection).
5. There is a failure event at a plurality of IP addresses (there is a normal connection).

The fault determining unit 160 recognizes the number of failures that have occurred based on the status code 171, and searches corresponding detecting conditions from the trouble event DB 150. The fault determining unit 160 then detects a fault producing location of the phenomenon that has presently occurred based on the detecting conditions that have been detected.

In the example shown in FIG. 22, the retransmission code is of a value "3", indicating that a failure event is occurring at a particular IP address and a normal connection is present up to that IP address. Based on this code, the trouble event DB 150 shown in FIG. 8 is searched, and detecting conditions "a failure is detected at an unspecific IP address and port at a certain connection" are detected. Therefore, it is judged that the non-adjacent transmission path is suffering a fault.

If a failure is detected, then the information of the corresponding connection table and the judged result of the fault location are registered in the fault information 110.

The above fault location judging process is carried out on each server, and fault information is generated. The fault information 110 generated in each server is collected by the management server 300. The collected fault information 110 includes status codes (generated by a merging process) and error messages (results estimated by the merging process (estimated failure producing locations and causes)). The management server 300 identifies a fault location in the network more accurately based on the collected fault information.

Figure 23:
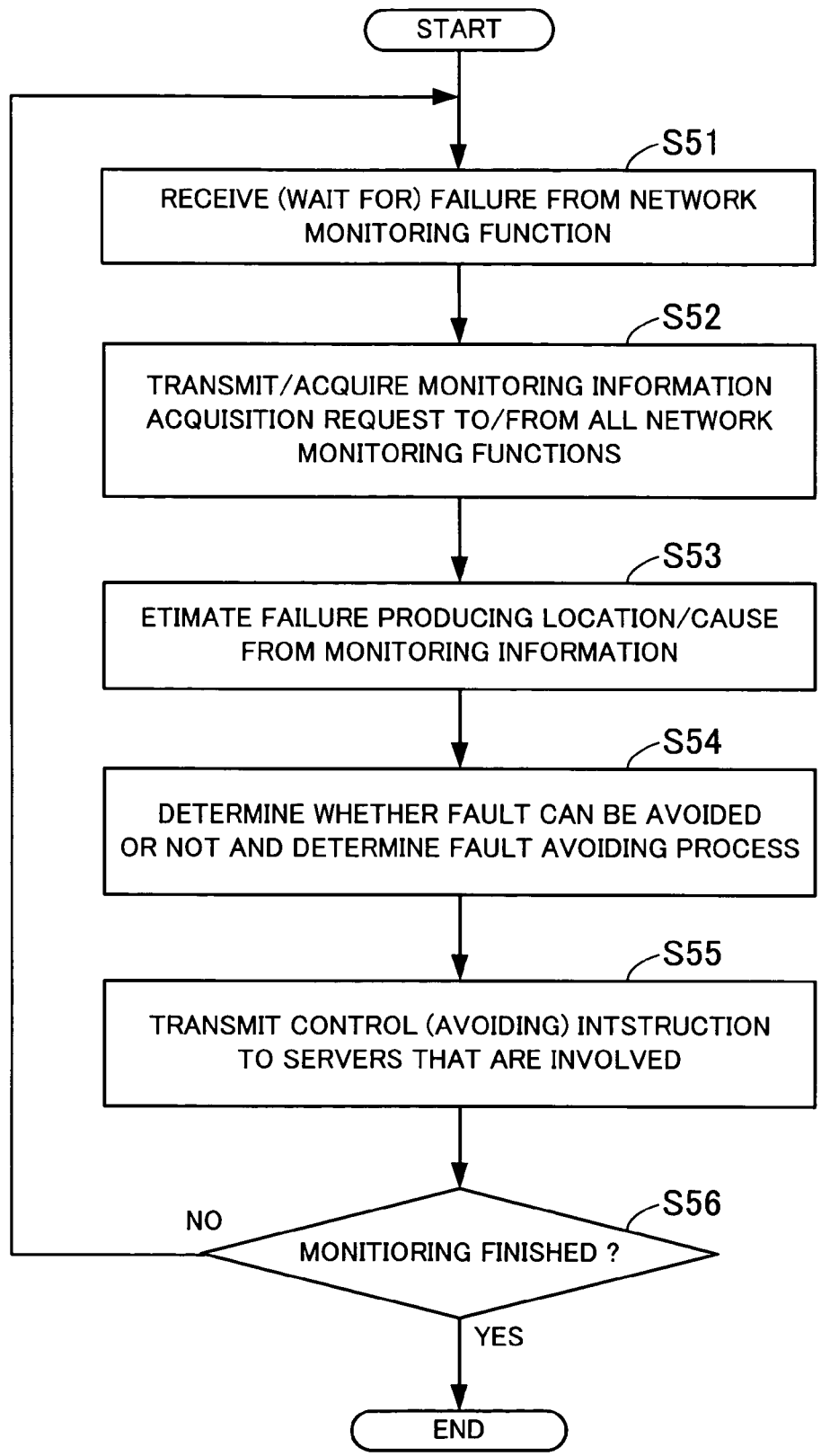
FIG. 23 is a flowchart of a fault location judging sequence at a management server.

FIG. 23 is a flowchart of a fault location judging sequence at the management server 300. The fault location judging sequence will be described below in the order of step numbers shown in FIG. 23.

[STEP S51] The management server 300 waits for a failure log to be sent from the network monitoring functions of other servers.

[STEP S52] The management server 300 transmits a monitoring information acquisition request to all network monitoring functions. The management server 300 then acquires monitoring information that is returned in response to the monitoring information acquisition request.

[STEP S53] The management server 300 estimates a fault producing location and cause based on the monitoring information sent from a plurality of servers. For example, as shown in FIG. 2, it is possible to judge that a SW is suffering a fault by analyzing monitoring information sent from the Web server 100 and the AP server 220.

[STEP S54] The management server 300 determines whether the fault can be avoided or not and also determines a process of avoiding the fault. For example, if a fault occurs in the SW 443 as shown in FIG. 2, a connection destination for communications that have been performed via the switch 443 is switched to the SW 444, thus avoiding the fault.

[STEP S55] The management server 300 transmits a control instruction based on the determined avoiding process to servers that are involved. For example, if a fault occurs in the SW 443 as shown in FIG. 2, the management server 300 instructs the Web server 100 and the AP server 220 to switch communications that have been performed via the switch 443 to communications via the SW 444.

[STEP S56] The management server 300 determines whether there is an instruction to end the monitoring process or not. If there is an instruction to end the monitoring process, then the fault location judging sequence is put to an end. If there is no instruction to end the monitoring process, then control goes back to STEP S51.

In this manner, the management server 300 determines a fault location on the network. The management server 300 can also display a fault producing situation on the network on a monitoring screen for the network administrator to judge a fault location.

Figure 24:
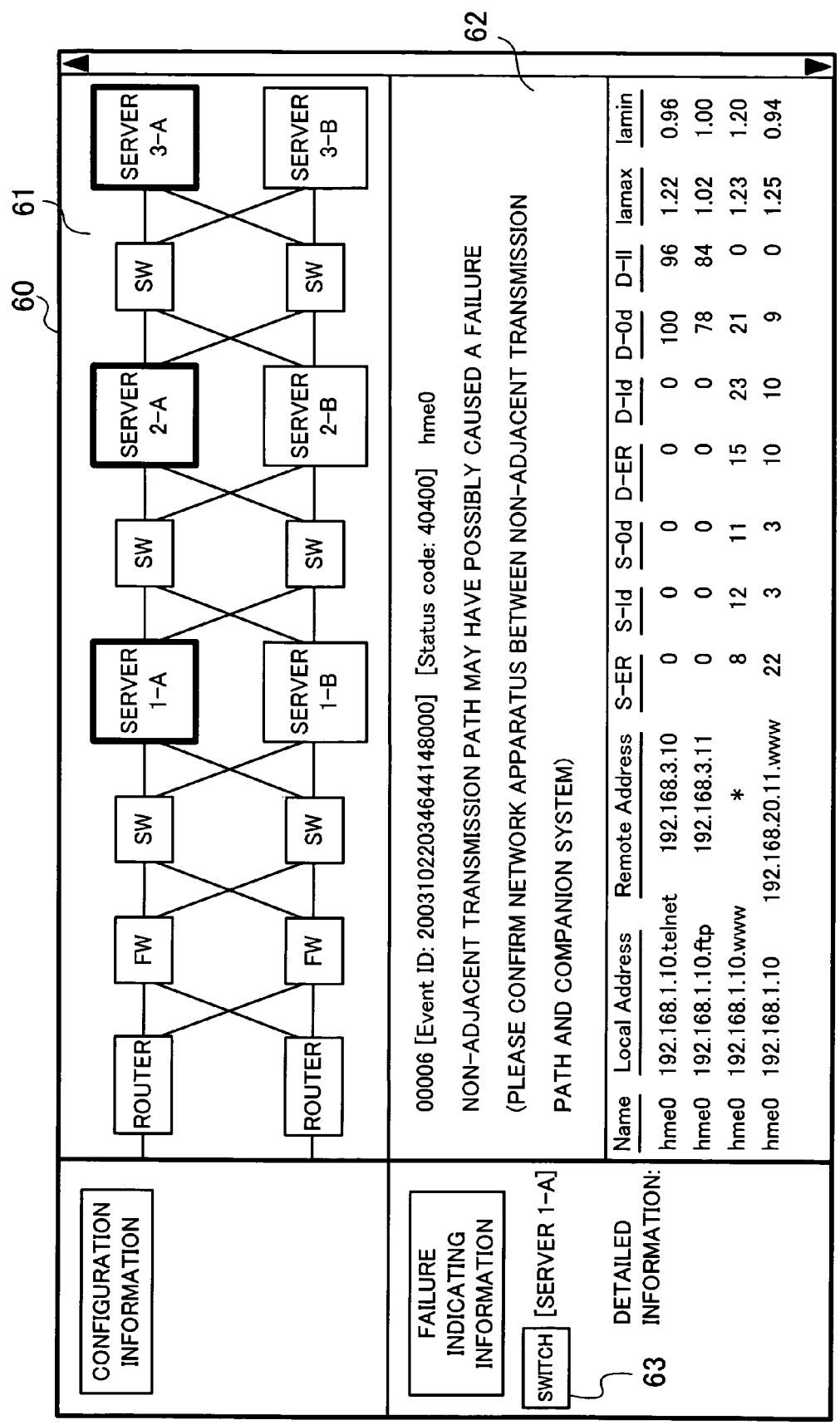
FIG. 24 is a diagram showing an example of a monitoring screen image.

FIG. 24 is a diagram showing an example of a monitoring screen image. As shown in FIG. 24, a monitoring screen image 60 includes a configuration information display section 61 and a failure indicating information display section 62.

The configuration information display section 61 displays the layout of nodes and their connections in the network. In the example shown in FIG. 24, servers which have detected a failure are detected are displayed in highlight for allowing the administrator to confirm fault locations easily.

The failure indicating information display section 62 displays the contents of a detected failure. For example, the failure indicating information display section 62 displays the contents of a status code and the identification number of a communication interface which suffers a failure. The failure indicating information display section 62 also displays a fault location determined by the servers. In the example shown in FIG. 24, the failure indicating information display section 62 displays a message "NON-ADJACENT TRANSMISSION PATH MAY HAVE POSSIBLY CAUSED A FAILURE (PLEASE CONFIRM NETWORK APPARATUS BETWEEN NON-ADJACENT TRANSMISSION PATH AND COMPANION SYSTEM)". The failure indicating information display section 62 further displays detailed information indicative of the state of each connection.

The contents displayed in the failure indicating information display section 62 can be switched by selecting a switching button 63.

According to the present embodiment, as described above, each server is capable of determining a fault location on the network while distinguishing a software fault location and a hardware fault location, thereby quickly identifying a fault location without depending on the experience of the network administrator.

Since the management server 300 collects the contents of a failure detected by a plurality of servers and determines a fault location based on the collected contents, fault locations can be sorted out in small segments. As a result, a fault location can be identified and the system can be recovered from a fault quickly.

The network monitoring function is capable of identifying whether the application of the own apparatus is a server or a client. For example, a server and a client can be distinguished from each other by detecting a synchronous request (SYN) packet that is transferred when a session is started.

Figure 25:
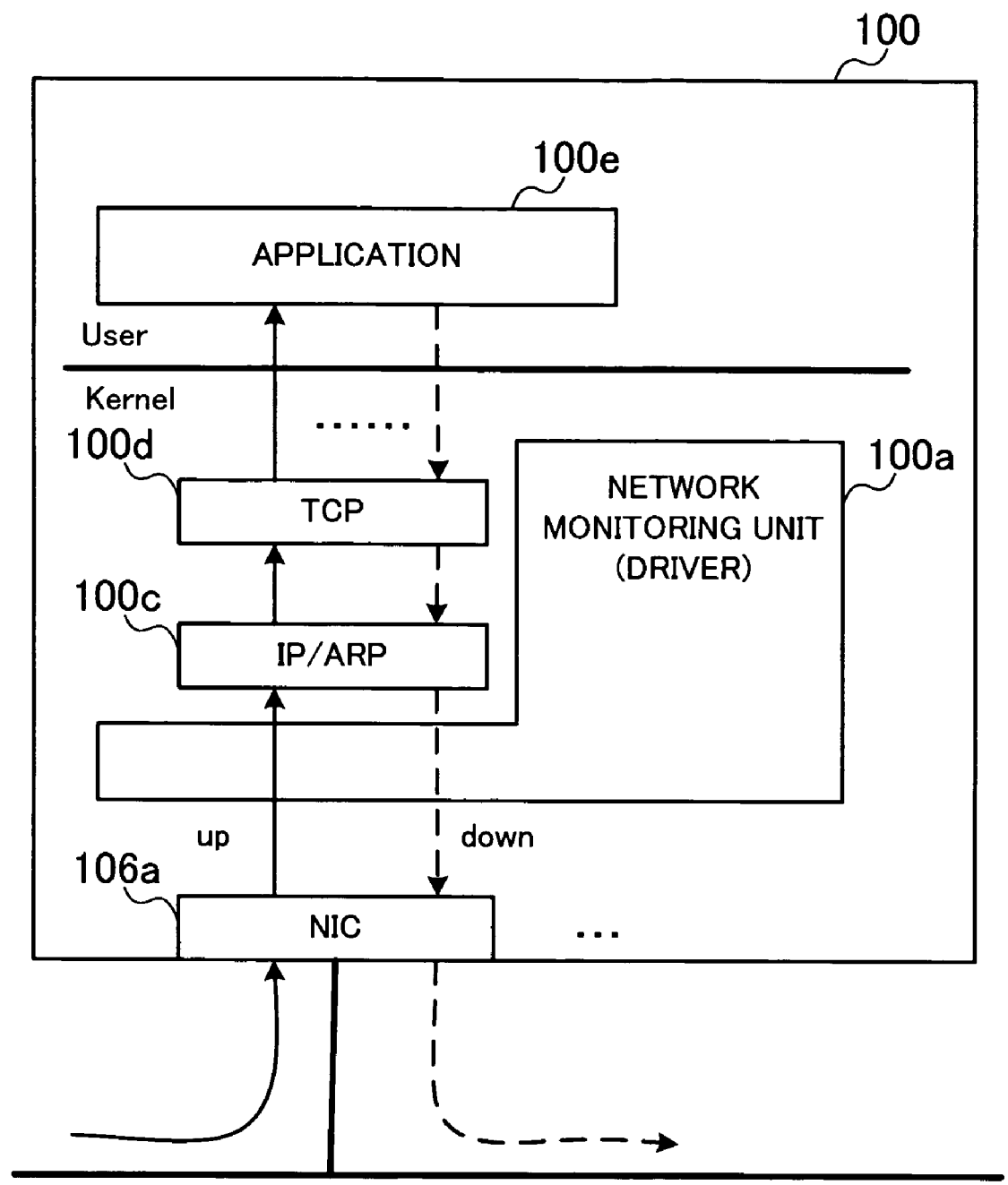
FIG. 25 is a diagram showing a server/client identifying function.

FIG. 25 is a diagram showing a server/client identifying function. FIG. 25 illustrates a process of determining a server/client using the software arrangement of the Web server 100. In the example shown in FIG. 25, a certain application 100e is installed in the Web server 100. If the application 300e functions as a server, a synchronous request packet is set from another apparatus to the application 100e. If the application 100e functions as a client, then the application 100e transmits a synchronous request packet to another apparatus.

The network monitoring unit 100a analyzes a TCP packet header of a packet which is transferred between the communication interface (NIC) 106a and the IP/ARP 100c. If the network monitoring unit 100a detects that a received packet is a synchronous request packet, then it determines the direction in which the synchronous request packet is transferred.

If the synchronous request packet is transferred from the communication interface 106a to the application 100e, then the synchronous request packet is transferred upstream (up). If the synchronous request packet is transferred from the application 100e to the communication interface 106a, then the synchronous request packet is transferred downstream (down).

If the synchronous request packet is transferred upstream, then the communication interface 106a judges that the application 100e is a server. If the synchronous request packet is transferred downstream, then the communication interface 106a judges that the application 100e is a client.

By thus identifying a server and a client, the accuracy with which to detect a failure can be changed depending on whether the application 100e is a server or a client. If the application 100e is a server, then a failure that has occurred in the apparatus tends to largely affects the activity. In this case, the accuracy with which the apparatus monitors a failure is increased to detect a failure quickly.

For example, if the application is a server, then the storage area of the RAM 102 or the like can efficiently be utilized by managing a plurality of connections with a single connection table. Specifically, the packet analyzer 120 (shown in FIG. 5) in the network monitoring unit 100a determines whether the application 100e is a client or a server, and sends the determined result to the connection monitor 130 (shown in FIG. 5). The connection monitor 130 generates a 0 connection table depending on the determined result indicative of whether the application 100e is a client or a server.

Specifically, if the application 100e is a client, then a connection table is generated for each connection established between the application 100e and another apparatus. The generated connection table has its contents identical to those shown in FIGS. 14 through 16.

If the application 100e is a server, then a plurality of connections established with respect to the application 100e are associated with one connection table. For example, when a first connection is established with respect to the application 100e, a connection table is generated, and even when second and other connections are established with respect to the application 100e, a new connection table is not generated. The connection monitor 130 monitors a plurality of connections with one connection table.

If the application 100e is a server, then the contents of the connection management table in the connection table are different from those that are generated if the application 100e is a client.

FIG. 26 is a diagram showing a data structure of a connection management table 141a in case the application is a server. The contents of the connection management table 141a are essentially the same as those of the connection management table 141 shown in FIG. 14, except for the contents of the companion apparatus IP and the companion apparatus Port.

In the connection management table 141a, "*. *. *. *." is set as the companion apparatus IP, indicating that the IP address of the companion apparatus is unspecific. Furthermore, "*" is set as the companion apparatus Port, indicating that the port number of the application in the companion apparatus is unspecific. If the own apparatus IP and own apparatus Port of a packet analyzed by the packet analyzer 120 are in agreement with those in the connection management table 141a, then the packet is judged as an object to be monitored using the connection table including the connection management table 141a.

As described above, if the application 100e is a server, a plurality of communication companions are managed altogether in one connection table, thereby reducing the load imposed on the Web server 100. Thus, any adverse effect on the activities to be performed by the application 100e is minimized.

The above processing functions can be performed by a computer when a program that is descriptive of the processing contents of the functions that are owned by the network monitoring units and the management server is executed by the computer. The program that is descriptive of the processing contents may be recorded on a recording medium that can be read by the computer. The recording medium that can be read by the computer may comprise a magnetic recording device, an optical disk, a magneto-optical recording medium, a semiconductor memory, or the like. The magnetic recording device may be a hard disk drive (HDD), a flexible disk (FD), a magnetic tape, or the like. The optical disk may be a DVD (Digital Versatile Disc), DVD-RAM (Random Access Memory), CD-ROM (Compact Disc Read Only Memory), a CD-R (Recordable)/RW (ReWritable), or the like. The magneto-optical recording medium may be an MO (Magneto-Optical) disk.

For distributing the program, portable recording mediums such as DVDs, CD-ROMs, etc. in which the program is recorded are sold. Alternatively, the program may be stored in a memory device of a server computer, and may be transferred from the server computer to another computer through a network.

The computer which executes the program stores, in its own memory device, the program that is recorded on a portable recording medium or transferred from a server computer. The computer then reads the program from its own memory device, and performs a processing sequence according to the program. The computer may directly read the program from the portable recording medium and perform a processing sequence according to the program. The computer may also perform a processing sequence according to the program each time the program is transferred from a server computer.

According to the present invention, as described above, elements which can be causes of faults are classified in advance, and events indicative of communication failures are associated in advance with the classified elements. When an event indicative of a communication failure is detected, an element which is responsible for a fault due to the detected event can automatically be determined. As a result, it is possible to automatically avoid the fault or quickly recover from the fault.

The foregoing is considered as illustrative only of the principles of the present invention. Further, since numerous modification and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable medium recording therein a network monitoring program for detecting a fault producing location on a network, said network monitoring program enabling a computer to function as:
memory means for storing a fault location determining table containing events indicative of failures of communications via the network, said events being associated with classified elements which can be causes of faults on said network;
communication situation monitoring means for monitoring communication situations with respect to other apparatus on said network;
failure detecting means for detecting an event indicative of a failure from a communication situation detected by said communication situation monitoring means;
fault location determining means for determining an element which is responsible for the event detected by said failure detecting means by referring to said fault location determining table; and
fault information output means for outputting fault information representative of a determined result from said fault location determining means.

2. The computer-readable medium according to claim 1, wherein said fault location determining table contains pieces of equipment connected to said network as said elements, said pieces of equipment being classified based on their connection to said network.

3. The computer-readable medium according to claim 2, wherein said pieces of equipment contained in said fault location determining table are classified into an own apparatus representing said computer itself, an adjacent transmission path adjacent to said computer, a non-adjacent transmission path other than said adjacent transmission path, and a companion apparatus with which said own apparatus communicate.

4. The computer-readable medium according to claim 3, wherein said fault location determining table contains an event associated with said own apparatus as indicating a delay of a response which is produced by said computer in acknowledgment of a received packet.

5. The computer-readable medium according to claim 3, wherein said fault location determining table contains an event associated with said adjacent transmission path as indicating a failure detected at all connections.

6. The computer-readable medium according to claim 3, wherein said fault location determining table contains an event associated with said non-adjacent transmission path as indicating a failure detected at a connection of communications with an apparatus having an unspecific address.

7. The computer-readable medium according to claim 3, wherein said fault location determining table contains an event associated with said companion apparatus as indicating a failure detected of communications with an apparatus having a specific address.

8. The computer-readable medium according to claim 1, wherein said fault location determining table contains functions performed by pieces of equipment connected to said network and defined as said elements.

9. The computer-readable medium according to claim 8, wherein said fault location determining table contains applications defined as said elements and events indicating that a connection is established to apparatus in which said applications operate and a connection is not established to said applications, and said communication situation monitoring means monitors whether a connection between applications and a connection between apparatus are established or not.

10. The computer-readable medium according to claim 8, wherein said fault location determining table contains a network monitoring function as said elements and events indicating that a connection is established in a transport layer of said network monitoring function, but a failure in a network layer of said network monitoring function is detected, and said communication situation monitoring means monitors whether a connection in said transport layer and a connection in said network layer are established or not.

11. The computer-readable medium according to claim 1, wherein said communication situation monitoring means determines whether a function operating in an own apparatus is a server or a client depending on header information of a packet that is communicated, and determines contents to be monitored of said function depending on the determined result.

12. The computer-readable medium according to claim 1, wherein said communication situation monitoring means monitors communication situations including normal communications with said other apparatus.

13. A computer-readable medium recording therein a network monitoring program for detecting a fault producing location on a network, said network monitoring program enabling a computer to function as:

fault information collecting means for collecting fault information from a plurality of apparatus on said network, each of said apparatus having memory means for storing a fault location determining table containing events indicative of failures of communications via the network, said events being associated with classified elements which can be causes of faults on said network, communication situation monitoring means for monitoring communication situations with respect to other apparatus on said network, failure detecting means for detecting an event indicative of a failure from a communication situation detected by said communication situation monitoring means, fault location determining means for determining an element which is responsible for the event detected by said failure detecting means by referring to said fault location determining table, and fault information output means for outputting fault information representative of a determined result from said fault location determining means; and fault producing location resolving means for judging an element which is commonly present in said fault information collected from said plurality of apparatus by said fault information collecting means, as a fault producing location on said network.

14. A network monitoring method for detecting a fault producing location on the network, comprising the steps of:

monitoring, with communication situation monitoring means, communication situations with respect to other apparatus on said network;

detecting, with failure detecting means, an event indicative of a failure from a communication situation detected by said communication situation monitoring means;

determining, with fault location determining means, an element which is responsible for the event detected by said failure detecting means by referring a fault location determining table containing events indicative of failures of communications via the network, said events being associated with classified elements which can be causes of faults on said network; and outputting, with fault information output means, fault information representative of a determined result from said fault location determining means.

15. A network monitoring apparatus for detecting a fault producing location on the network, comprising:

memory means for storing a fault location determining table containing events indicative of failures of communications via the network, said events being associated with classified elements which can be causes of faults on said network;

communication situation monitoring means for monitoring communication situations with respect to other apparatus on said network;

failure detecting means for detecting an event indicative of a failure from a communication situation detected by said communication situation monitoring means;

fault location determining means for determining an element which is responsible for the event detected by said failure detecting means by referring to said fault location determining table; and fault information output means for outputting fault information representative of a determined result from said fault location determining means.

* * * * *